United States Patent
Yamana et al.

[11] Patent Number: 5,712,062
[45] Date of Patent: Jan. 27, 1998

[54] CARBON FLUORIDE PARTICLES, PREPARATION PROCESS AND USES OF THE SAME

[75] Inventors: Masayuki Yamana; Takahiro Kitahara; Tomohiro Isogai, all of Settsu, Japan

[73] Assignee: Daikin Industries, Ltd., Osaka, Japan

[21] Appl. No.: 832,848

[22] Filed: Apr. 4, 1997

Related U.S. Application Data

[63] Continuation of Ser. No. 256,239, Jul. 1, 1994, abandoned.

[30] Foreign Application Priority Data

| Nov. 6, 1992 | [JP] | Japan | 4-297450 |
| Dec. 25, 1992 | [JP] | Japan | 4-347165 |
| Jan. 21, 1993 | [JP] | Japan | 5-008188 |

[51] Int. Cl.[6] .................................................. H01M 4/58
[52] U.S. Cl. .................... 429/218; 106/2; 204/290 R; 209/127.1; 252/500; 252/502; 419/23; 423/414; 423/439; 428/402; 508/112
[58] Field of Search .................... 423/414, 439; 106/2; 419/23; 204/290 R; 429/218; 252/500, 502; 209/127.1; 508/112; 428/402

[56] References Cited

U.S. PATENT DOCUMENTS

| 4,855,121 | 8/1989 | Metzger | 423/439 |
| 4,859,444 | 8/1989 | Kita et al. | 423/439 |

FOREIGN PATENT DOCUMENTS

| 0142113 | 5/1987 | European Pat. Off. | 423/439 |
| 50-143975 | 11/1975 | Japan . | |
| 55-140706 | 11/1980 | Japan . | |
| 57-196477 | 12/1982 | Japan . | |
| 58-209769 | 12/1983 | Japan . | |
| 60-48050 | 3/1985 | Japan . | |
| 62-139255 | 6/1987 | Japan . | |
| 02151872 | 6/1990 | Japan . | |

*Primary Examiner*—Kathryn L. Gorgos
*Attorney, Agent, or Firm*—Varndell Legal Group

[57] ABSTRACT

Carbon fluoride particles in which a number-average particle size is 0.01 to 50 μm, a content of particles having such a diameter that the particles size distribution falls with in range of the number-average particle size ±20% amounts to at least 50% of the whole, a true specific gravity is 1.7 to 2.5, a F/C as a whole is 0.001 to 0.5, and a F/C at the surface is always larger than the F/C as a whole and is 0.1 to 2.0. These carbon fluoride particles are obtainable by reacting carbon particles with fluorine at 350° to 600° C. for one minute to six hours. These carbon fluoride particles have an excellent dispersibility and a powder flowability, and are usable solely or in the form of composite, as water- and oil- repellents, non-tackifying agents, solid lubricants, agents for imparting electric conductivity, additives to toner for developing electrostatic image, additives to coating of carrier for developing electrostatic image, composite materials for fixing roller, phosphoric acid fuel cells, zinc/air batteries and nickel/hydride storage batteries.

18 Claims, 1 Drawing Sheet

HYDROGEN GAS      OXYGEN GAS

↑ HYDROGEN GAS   ↑ OXYGEN GAS

CARBON FLUORIDE PARTICLES, PREPARATION PROCESS AND USES OF THE SAME

CROSS REFERENCE TO RELATED APPLICATION

This application is a continuation of U.S. Ser. No. 08/256,239, filed Jul. 1, 1994, now abandoned, which is a U.S. National Stage application of PCT international application No. PCT/JP93/01568, filed Oct. 28, 1993.

TECHNICAL FIELDS

The present invention relates to novel carbon fluoride particles and preparation process of the same, and applications for water- and oil-repellents, non-tackifying agents, solid lubricants, agents for imparting electric conductivity, composite materials of various forms, additives to toners and additives to carrier coating for developing electrostatic image, fixing rollers, phosphoric acid fuel cells, zinc/air batteries, and nickel/metal hydride batteries.

BACKGROUND ARTS

Carbon fluorides can be prepared by fluorinating various carbon powder materials, and are present as solid powders. Since carbon fluorides have an extremely low surface energy, and can exhibit their excellent characteristics under sever conditions regardless of atmosphere, the carbon fluorides have been evaluated as excellent industrial materials in wide technical fields such as water- and oil-repellents, mold-releasing compounds, non-tackifying agents and solid lubricants.

When utilizing those excellent properties of the carbon fluorides, rather than that the carbon fluoride powder is used alone in the form of powder, the carbon fluorides are generally utilized, for example, usually in the manner of adding and dispersing the carbon fluoride particles into materials such as resins and rubbers, in the manner of dispersing into oils, greases, organic solvents or aqueous solutions, or in the manner of fine particle composites with other powders.

However, when utilizing the above excellent various properties by composing the carbon fluoride powder with other materials, there is a problem that, since it is difficult to disperse the carbon fluoride powder in the other materials uniformly and stably with other materials, the desired properties cannot be sufficiently obtained.

The reasons are in that, since commercially available, common, and conventional carbon fluoride particles are highly fluorinated throughout the inner portion to provide particles which are wholly in the form of carbon fluoride, (1) the specific gravity becomes higher to about 2.5 to 3.0, and (2) during the fluorinating step, the particles are broken irregularly due to stress yielded in the whole particle to make the particle size distribution very wide and to make the particle shape irregular, because though a spacing of (001) plane of microcrystal of graphite is 0.34 nm, a spacing of the plane of carbon fluoride widens to about 0.6 to 0.9 nm due to the fluorination. Therefore, the wholely fluorinated carbon fluoride is inferior in dispersibility and powder flowability.

If carbon fluoride particles having a low specific gravity and a narrow particle size distribution can be obtained, such carbon fluoride particles are advantageous in view that a difference of specific gravity from a dispersing medium is made small to improve the dispersibility. For example, as carbon fluoride particles which may have a low specific gravity, JP-A-142968/1975 discloses carbon fluoride particles having a fluorine content of 35 to 55% by weight (corresponding to an atomic ratio of fluorine atom to carbon atom (hereinafter referred to as "F/C") of 0.34 to 0.77).

However, the carbon fluoride particles having such a high F/C within the above range are in such a state that the spacing of (001) plane of the crystal is maximum, and thus, as mentioned above, the particles tend to be broken. Therefore, when dispersing into other materials, there remains a problem as to dispersibility, and the excellent lubrication property cannot be exhibited.

Also, it is known that modified carbon materials for composite materials prepared by treating the carbon surface with a fluorine gas at −80° to 50° C. (JP-B-38686/1992). However, there not yielded any carbon fluoride on the surface of the material, but is only yielded a weak, semi-ionic C-F bond which contributes to hydrophilic property. Accordingly, the treated carbon fluoride does not exhibit a water-repelling property which is owned by the carbon fluoride, rather becomes more hydrophilic than the starting carbon material (Proceedings of 16th Fluorine Chemistry Conference, p16 (Sep. 20, 1991), 17th Proceedings of Fluorine Chemistry Conference p21-22 (Sep. 21, 1992)).

There is a graphite material for an atomic reactor, which comprises a carbon fluoride at a part or all of its surface region or of pores of surface layer (JP-B-31283/1981). This art directs to graphite molding, and is technically different from carbon fluoride which is used in the manner of additives to other materials.

The present invention has been completed from those viewpoints, and one object is to provide novel carbon fluoride particles having an excellent dispersibility and powder flowability and further a controllable conductivity and charging property which are not owned by the conventional carbon fluoride particles, as well as a water-repelling property, oil-repelling property, lubricating property, non-adhesion, non-wetting property and stain resistant which are owned by the conventional carbon fluoride particles, said carbon fluoride particles being carbon fluoride particles with a low specific gravity in which the F/C as a whole is maintained at a low level but the F/C at the particle surface is high.

An object of the present invention is to provide a process for preparing the novel carbon fluoride particles in which a consuming amount of expensive fluorine gas can be reduced.

An object of the present invention is to provide, as applications of the novel carbon fluoride, a water- and oil-repellent, a non-tackifying agent, a solid lubricant and an agent for imparting electric conductivity.

Another object of the present invention is to provide a composite material which is composed with various other materials in various manners.

Another object of the present invention is to provide an additive to toners which gives excellent effects that an amount of toners adhered to the carrier surface for developing electrostatic image can be reduced and that a cleaning property of the toners remaining on a surface of a photoreceptor can be improved.

Further object of the present invention is to provide an additive to carrier coating in order to produce a carrier for developing electrostatic image, which is excellent in abrasion resistance and toner-spent property and does not yield irregularity in toner charge.

An object of the present invention is to provide a fixing roller for developing electrostatic image, which does not cause both the hot offset and electrostatic offset.

An object of the present invention is to provide a gas diffusion electrode for a phosphoric acid fuel cell or an air battery, which has a small internal resistance and a long life.

An object of the present invention is to provide an alkaline battery using a hydrogen-absorbing alloy, which is excellent in rapid charging and has a long durability.

DISCLOSURE OF THE INVENTION

The present invention relates to carbon fluoride particles in which a number-average particle size is 0.01 to 50 μm, a content of particles having such a diameter that the particle size distribution falls within the range of the number-average particle size ±20% amounts to at least 50% of the whole, a true specific gravity is 1.7 to 2.5, a F/C of the particle as a whole is 0.001 to 0.5, preferably 0.001 to 0.3, particularly preferably 0.001 to 0.2, and a F/C at the surface of the particle is always larger than the F/C as a whole and is 0.1 to 2.0, preferably 0.3 to 2.0.

The present invention also relates to a process for preparing carbon fluoride particles, which comprises preheating at 350° to 600° C. a carbon powder in which a number-average particle size is 0.01 to 50 μm and a content of particles having such a diameter that the particle size distribution falls within the range of the number-average particle size ±20% amounts to at least 50% of the whole, introducing a fluorine gas, and then reacting the carbon particles with the fluorine gas at a temperature of the above range.

The present invention relates to various uses of the above carbon fluoride particles, for example, to a water- and oil-repellent, a non-tackifying agent, a solid lubricant, an agent for imparting electric conductivity, an additive to coating of carrier for developing electrostatic image, a composite material combined with other materials and a fine composite particle coated with other materials; and, using the above material, a fixing roller, a gas diffusion electrode, a phosphoric acid fuel cell, an air battery and an alkaline battery.

The present invention relates for an additive to toners for developing electrostatic image comprising carbon fluoride particles in which a number-average particle size is 0.01 to 50 μm, a content of particles having such a diameter that the particle size distribution falls within the range of the number-average particle size ±20% amounts to at least 50% of the whole, a true specific gravity is 1.7 to 2.5, a F/C as a whole is 0.001 to 0.3, and a F/C at the surface is always larger than the F/C as a whole and is 0.1 to 2.0.

PREFERRED EMBODIMENTS OF THE INVENTION

Figure 1:
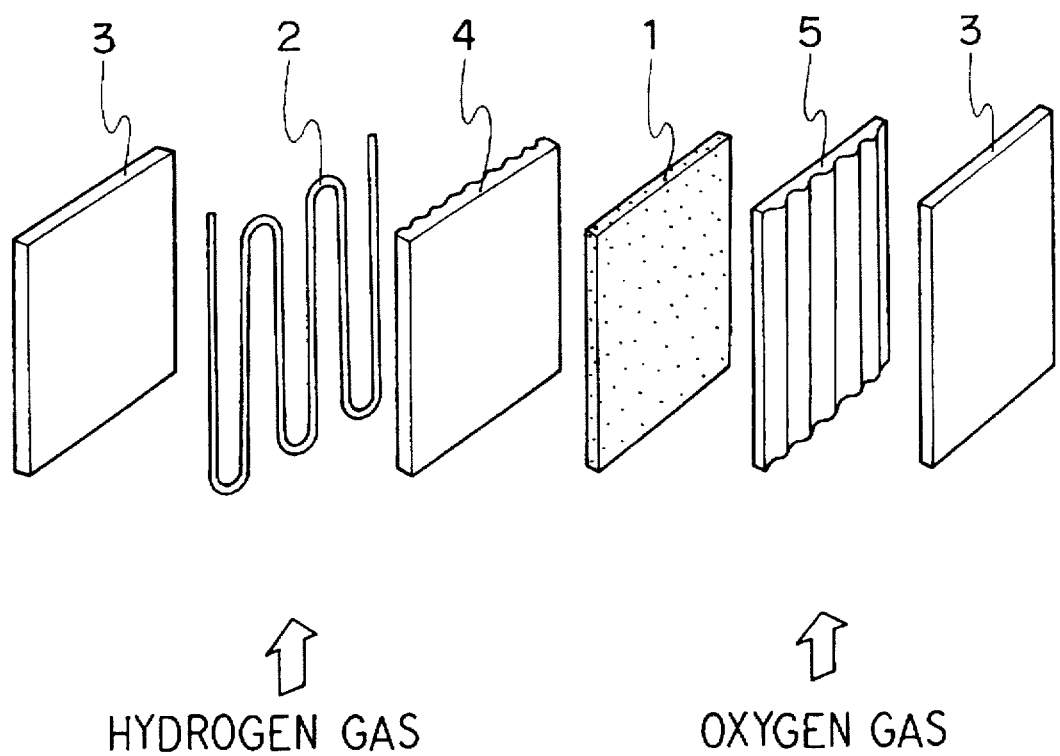
FIG. 1 shows a diagrammatic perspective view of one embodiment of the construction of the phosphoric acid fuel cell according to the present invention.

The carbon fluoride particles of the present invention are particles having so-called core-shell structure, and comprise a core portion of substantially made of carbon and a shell portion which is thin and has a large content of carbon fluorine, a F/C of the shell portion is always larger than that of the core.

The the carbon fluoride particles of the present invention are stronger than those of the prior art, and thus, difficult to break, eventhough the F/C of the shell portion is larger. It is believed that the reason for this is that the fluoride is present in a relatively large amount in the shell portion and the stress occurs only near the surface region, and the stress is not present in deeper portions or the core of the particles, and thus, the breakage does not occur over the whole of the particle.

The carbon fluoride obtained according to the present invention does not have a clear peak at and near the angle of diffraction corresponding to (001) plane by means of X-ray diffractometry, and even if a peak is observed, such a peak is broad. It is assumed that, depending on the kind of starting carbon, since the carbon fluoride exists thinly in the surface region of the particle, a sharp peak may not be observed.

The carbon fluoride in the present invention is generally obtainable by reacting various carbon materials with fluorine, and substantially comprises an inorganic polymer carbon fluoride in which carbon atom is chemically, covalently bonded.

The carbon fluoride particles of the present invention have a number-average particle size of 0.01 to 50 μm. When the number-average particle size becomes smaller, a secondary agglomeration tends to occur strongly, and thus, in use, it is difficult to disperse uniformly in the materials. When larger, dispersibility becomes worse. A preferred range is 0.01 to 20 μm, a more preferred range is 0.1 to 10 μm.

In the present invention, the particle size distribution and the number-average particle size are determined in the following manners.

Particle sizes of randomly selected 100 particles in an scanning electron microscopic photograph are measured. From the number of particles of each particle size, there is obtained a particle size distribution. Then, a number-average particle size is calculated from the particle size distribution.

The carbon fluoride particles of the present invention have a particle size distribution in which a content of particles having such a diameter that the particle size distribution falls within the range of the number-average particle size ±20% amounts to at least 50% of the whole. When the particle size distribution becomes wider than this the F/C of the particles as a whole and the F/C at the surface of the particles cannot be uniform, i.e., some particles having too high or too low F/C are present in the particle mixture in addition to the particles having the desired F/C. Preferred particle size distribution is that the particles having such a diameter that the particle size distribution falls within the range of the number-average particle size ±20% amounts to at least 60% of the whole, more preferably at least 70% of the whole.

The carbon fluoride particles of the present invention have a true specific gravity of 1.7 to 2.5. The lower limit of the true specific gravity depends on a true specific gravity of the starting carbon. When the true specific gravity is larger than 2.5, the carbon fluoride cannot maintain its spherical shape and is inferior in dispersibility. Preferred true specific gravity is 1.7 to 2.3, more preferably 1.7 to 2.0.

A true specific gravity of the carbon fluoride particles is measured by means of a usual method in which, for example, ethanol described in Hideaki Chihara, "Butsurika-gaku Jikkenho" 3rd ed. Tokyo Kagaku Dojin (1988) is used, and the particles in a pycnometer is weighed.

The F/C of the particle as a whole resides between 0.001 and 0.5. When the F/C is smaller, the desired performance cannot be obtained, because an amount of carbon fluoride is not enough. When larger, the particle begins to break and thus does not maintain its spherical shape, which results in bad dispersibility. Preferred F/C is 0.001 to 0.3, more preferably 0.001 to 0.2.

In the present invention, a F/C of the particle as a whole is measured as follows.

Carbon fluoride particles are burned together with a combustion improver $Na_2O_2$ and a polyethylene film in a flask filled with oxygen, and the produced hydrogen fluoride HF is absorbed in water. An amount of the produced HF is measured with a fluoride ion specific electrode ion meter (Ion Analyzer 901 of Orion Corp.). From the measured value, regarding all the remaining portion of the carbon fluoride particle as carbon, a ratio F/C of the number of fluorine atoms to the number of carbon atoms is calculated. The obtained value is a F/C of the particle as a whole.

The F/C of the carbon fluoride particle at the surface is defined by the value obtained by the following measurement.

The $F_1s$ spectrum (680 to 700 eV) and $C_1s$ spectrum (280 to 300 eV) of a carbon fluoride particle are measured with X ray photoelectron spectrometer (ESCA-750 of Shimadzu Co., Ltd.). From a ratio of areas in the charts corresponding to each spectrum, a ratio F/C of the number of fluorine atoms to the number of carbon atoms at the surface of the carbon fluoride particle is calculated.

The F/C at the surface is 0.1 to 2.0, preferably 0.3 to 2.0, more preferably 0.5 to 1.5.

The carbon fluoride particles of the present invention are excellent in dispersibility and powder flowability. These properties are further improved when the shape of the particle goes near sphere. Generally, there is employed a degree of sphere which indicates how approximate a particle is to be spherical. The carbon fluoride particles of the present invention usually have a degree of sphere of 0.5 to 1.0, preferably 0.8 to 1.0.

A degree of sphere of the carbon fluoride particles of the present invention is defined by (circumferential length of a circle which has the same area as area of projected image of particle) /(length of profile of projected image of particle), and is specifically described in Kiichiro Kubo et al. "Funtai Riron to Oyo" 2nd ed. p50. Maruzen (1979). In an exemplified method, it can be measured by using an image analyzer (TVIP-4100 II of Nippon Avionics Co., Ltd.). When a particle is perfectly spherical, a degree of sphere is 1.0. When a particle is flattened or irregular, a degree of sphere becomes small.

The preparation of the carbon fluoride particles of the present invention can be carried out by pre-heating, to from 350° to 600° C., carbon particles in which a number-average particle size is 0.01 to 50 μm and a content of particles having such a diameter that the particle size distribution falls within the range of the number-average particle size ±20% amounts to at least 50% of the whole, introducing a fluorine gas, and reacting the carbon particles with fluorine at a temperature of the above range for a given reaction time to fluorinate the carbon particles.

In the present invention, the reason why the carbon particles are pre-heated to the reaction temperature is to fluorinate the surface of the carbon particle within a short time at the constant temperature. If the pre-heating is not carried out, the carbon particles are gradually fluorinated from a low temperature, which cannot provide the carbon fluoride particles of the present invention.

In the process of the present invention, the carbon particles having the given properties are fluorinated at about 350° C. to about 600° C. for a given time in the presence of fluorine.

When the reaction temperature is lower than about 350° C., the surface of the carbon particles cannot be sufficiently reacted with fluorine, when higher than about 600° C., there is a tendency that thermal decomposition reaction occurs preferently than the production of the carbon fluoride particles. The reaction time varies with the reaction temperature. When the reaction time is shorter, it is difficult to fluorinate the surface of the carbon particles sufficiently and uniformly. When longer, the fluorination also occurs inside the carbon particle, thereby the particles are broken to be in an amorphous shape. Preferred reaction temperature varies with a type of and particle size of the carbon particles, and is 400° to 550° C., more preferably 400° to 500° C. The reaction time is usually from one minute to six hours, preferably five minutes to three hours, more preferably ten minutes to two hours.

According to the process of the present invention, since the reaction is carried out within a relatively short time under the particular reaction conditions, the obtained carbon fluoride particles have a low F/C in the core portion and a high F/C at the surface (shell portion) of the carbon particle.

The fluorine gas is usually introduced after diluting with nitrogen, argon, helium, air or the like to 2 to 100% by volume, preferably 2 to 50% by volume, more preferably 5 to 20% by volume. To the dilution gas, if necessary, there are added oxygen, tetrafluorocarbon, hydrogen fluoride and the like. After the reaction, the fluorine gas is instantly purged with an inert gas, and then the carbon fluoride particles are cooled.

The staring carbon particles used in the process of the present invention have a degree of sphere equal to that of the desired carbon fluoride particles. A degree of sphere of the carbon particles is generally 0.5 to 1.0, preferably 0.8 to 1.0.

Examples of the carbon particles to be fluorinated in the process of the present invention are, for instance, mesocarbon microbeads (MC) (carbon thermally treated at 2800° C. available from OSAKA Gas Co., Ltd.; number-average particle size: 6 to 20 μm; content of particles having such a diameter that the particle size distribution falls within the number-average particle size ±20%:50%; degree of sphere: 0.7 to 0.8; true specific gravity: 2.1 to 2.2), fine thermal (FT) (available from Asahi Carbon Co., Ltd.; number-average particle size: 0.09 μm; particle size distribution (particles falling within the number-average particle size ±20%): 70%; degree of sphere: 0.9 to 1.0; true specific gravity: 1.8 to 1.9), medium thermal (available from Columbia Carbon Co., Ltd.; number-average particle size: 0.35 μm; particle size distribution (particles falling within the number-average particle size ±20%): 60%; degree of sphere: 0.9 to 1.0; true specific gravity: 1.8 to 1.9), acethylene black (Denka Black available from Denki Kagaku Kogyo Co., Ltd.; number-average particle size: 0.04 μm; particle size distribution (particles falling within the number-average particle size ±20%): 70%; degree of sphere: 0.9 to 1.0; true specific gravity: 1.8 to 1.9), furnace black, and the like.

The carbon fluoride particles of the present are excellent in powder flowability. Therefore, not only when used alone but also when used by adding to resins, rubbers, films, paints, oils, aqueous solutions, greases, various other various inorganic materials, and other metallic materials, the handling property is good, and as mentioned hereinbefore, the dispersibility is also good.

Uses utilizing the water-repelling property are, for instance, an additive for films, an additive for resins, an additive for paints, and an additive for rubbers, and an additive for plating dispersions. Concrete examples are, for instance, an air electrode for air battery, a gas diffusion electrode for phosphoric acid fuel cell, an anode for closed-type secondary battery having an anode of hydrogen-absorbing alloy, and the like.

Uses utilizing the non-tackifying (releasing) property are, for instance, an additive for films, an additive for resins, and an additive for paints and an additive for rubbers, and concrete examples are, for instance, a fixing roller for electrostatic copying machine, a resin molding die, and a releasing agent for plastic molding, rubber molding, a die-cast article, a glass article and a sintered alloy, and the like.

Uses utilizing the lubricating property are, for instance, and an additive for lubricating oils and greases. Examples of the lubricating oils are, for instance, mineral oils such as naphthenic hydrocarbons, paraphinic hydrocarbons and aromatic hydrocarbons; synthetic oils such as olefinic polymerized oils, diester oils, polyalkylene glycol oils, halogenated hydrocarbon oils, silicone oils and phosphate oils; and fatty oils. Examples of the grease are greases prepared by adding a metallic soap, bentonite, silica gel, coper phthalocyanine, allylurea and fluorine-containing resin to a base oil such as the above-mentioned mineral oil or synthetic oil.

Concrete examples are an engine oil for cars, a wheel bearing grease, a graphite grease, a lubricant for drawing of metal, and the like.

The carbon fluoride particles have a surprising property, i.e. controllable electric conductivity. Carbon particles such as carbon black are electrically conductive, but the fluorinated carbon becomes an insulator. Though the conductivity remains in an incompletely fluorinated carbon to some extent, since the carbon is fluorinated as a whole, the remaining conductivity is low, and is not enough to provide an additive utilizing as an agent for imparting conductivity. The carbon fluoride particles of the present invention have, as mentioned above, the core-shell structure, and the shell portion is a very thin carbon fluoride layer. Therefore, it is assumed that the conductivity of carbons of the core portion is not so lost.

Accordingly, the carbon fluoride particles of the present invention can further be applied to the use utilizing the electric conductivity. Examples of the use utilizing the conductivity are, for instance, a conductive paint, an antistatic resin composition, an antistatic container for semiconductor tip, an antistatic and abration resistive sheet, a cleaning brade for brushing a photosensitive drum of electrostatic copying machine, a fixing roller of electrostatic copying machine, a toner or carrier for electrostatic copying machine, a variable resistor, a gas diffusion electrode for phosphoric acid fuel cell, an air electrode for air battery, a surface treating agent for hydrogen-absorbing alloy in alkaline battery, and the like.

Though the carbon fluoride particles can be solely applied to various uses utilizing their excellent properties, by combining with other materials, it is possible to endow the specific functions of the carbon fluoride particles of the present invention with the other materials.

Examples of the composite materials are, for instance, composite materials in which the carbon fluoride particles are added and dispersed into solid materials such as resins, rubbers, metals, ceramics and carbons, liquid materials such as oils, organic solvents, water and various aqueous solutions. As the resins, there are employed resins which can be endowed with the specific functions of the carbon fluoride. Examples of the synthetic resins are phenol resin, urea resin, epoxy resin, fluorine-containing resin, acetal resin, polycarbonate, polyamide, polyimide, polyester, polyphenylene sulfide, silicone resin and the like. Examples of the rubbers are styrene-butadiene rubber, chloroprene rubber, neoprene rubber, nitrile rubber, ethylene-propylene-butadiene rubber, and the like. Examples of the metals are aluminium, titanium, nickel, lead, tin, copper, zinc, and the like. Also, alloys such as Duralumin (an aluminum alloy containing 4% cooper and smaller amounts of magnesium, manganese, iron, and silicon), stainless steel and hydrogen-absorbing alloy may also be employed. Examples of the ceramics are $SiC$, $Si_3N_4$, $BN$, $AlN$, $PbSnF_4$, as well as oxides such as alumina, zirconia, yttria and titania, and the like. Examples of the carbons are meso- carbon microbeads, needle coke, carbon black, pitch, tar, and the like. Examples of the oils are mineral oils and synthetic oils such as polyolester oils as well as fluorine-containing oils such as perfluoropolyether and chlorotrifluoroethylene CTFE oligomer. However, oils which contain an amine additive are not preferable. Examples of the organic solvents are alcohols such as ethanol, hydrocarbons such as benzene, halogenated hydrocarbons (hydrogen atom may be contained in the molecule), and the like. Examples of the aqueous solutions are aqueous solutions containing a surfactant, more specifically a plating solution, and the like.

A composite with a solid material can be prepared, for example, by dispersing the carbon fluoride particles as a solid material in a proper organic solvent or aqueous solution. The dispersion can be dried as it is or after coating it on a substrate in order to remove the organic solvent or the like. If necessary, a post-treatment of the dispersion, such as sintering can be carried out. Other methods can be employed to obtain a solid material containing the carbon fluoride particles, such as powder-coating or compression-molding the particles and, if necessary, the resulting products can be post-treated, such as by sintering. According to these methods, the solid material can be provided in the form of a thin film, a porous member, a coating and a molded article.

A composite with a liquid material can be prepared, for example, by dispersing the carbon fluoride particles in a liquid material with an ultrasonic dispersing machine. If necessary, an additive such as a surfactant may be added. The liquid composite may be in the form of paint, spraying solution, plating solution, lubricating oil, grease and the like.

Further, it is possible to prepare fine composite particles by coating the solid particles with the carbon fluoride particles of the present invention. Examples of the solid particles are, for instance, resin particles, rubber particles, metal particles, ceramic particles, carbon particles, and the like. Usable particle size is within the range of 0.1 to 500 µm, and the shape of the solid particle may not be spherical. A preferred method for coating with the carbon fluoride particles is, for example, a method in which an impact mixing method or a mixing with agitation is conducted with an impact surface improving machine or a high speed agitation type mixer (dry type). The fine composite particles are suitably available for the uses such as a water- and oil-repellent, a non-tackifying agent, a solid lubricant, an agent for imparting electric conductivity and the like, and more specifically, a powder paint for electrostatic coating, a powder for flame spraying, a powder for powder metallurgy, an additive for plating dispersion, an additive to toner for developing electrostatic image, an additive to resinous coating of carrier for developing electrostatic image, a hydrogen-absorbing alloy electrode of alkaline battery in which hydrogen-absorbing alloy is used, a lubricant for draw-processing of metals, an additive to coating of a fixing rollers, and the like.

The carbon fluoride particles of the present invention are particularly useful as an additive to toner for developing electrostatic image. Hitherto, in order to prevent the toners from adhesion to the surface of the carriers and the surface of the photoreceptor, carbon fluoride particles have been added to the toners. However, the adhesion-preventing effect in the prior methods is insufficient, because the carbon fluoride particles obtained by the prior methods are poor in powder flowability due to their irregular shape and wide particle distribution, and thus are not sufficiently dispersed into the toners. The carbon fluoride particles of the present invention are excellent in dispersibility and powder flowability, and are an additive to toner which has not been found in the prior arts.

Namely, the present invention also relates to an additive to toner for developing electrostatic image comprising the carbon fluoride particles in which a number-average particle size is 0.01 to 10 μm, preferably 0.1 to 10 μm, a content of particles having such a diameter that the particle size distribution falls within the range of the number-average particle size ±20% amounts to at least 50% of the whole, a true specific gravity is 1.7 to 2.5, the F/C of the particle as a whole is 0.001 to 0.3, and the F/C of the particle at the surface is always larger than the F/C as a whole and is 0.1 to 2.0.

The carbon fluoride particles used in the additive to toner for developing electrostatic images of the present invention are the same as the carbon fluoride particles of the present invention except that the number-average particle size is 0.01 to 10 μm. When the number-average particle size of the carbon fluoride particles is larger than 10 μm, there is a tendency that, since the particle size becomes near the particle size of the toner, the characteristics of the toner cannot be exhibited sufficiently.

Since the additive to toner for developing electrostatic image of the present invention has a uniform shape, a narrow particle size distribution and a small true specific gravity, the additive is excellent in powder flowability and dispersibility and thus are uniformly dispersed in the toner. As a result, since the surface of the additive to toner is fluorinated, the adhesion-preventing effect of toner to the carrier surface and the removability of the remaining toner on the photosensitive drum can be improved.

The additive to toner for developing electrostatic image of the present invention is used by adding to the toner with which usual components are blended. Examples of the usual components which constitute the toner are, for instance, a binder resin, a coloring agent, and the like.

An amount of the additive to toner for developing electrostatic image is 0.01 to 10 parts by weight to 100 parts by weight of the toner. When larger amount, the characteristics of the toner cannot be exhibited, and when smaller, effects of the additive cannot be obtained. Preferred amount is 0.1 to 3 parts by weight.

Examples of the binder resins are, for instance, homo- or co-polymers of styrenes such as styrene, chlorostyrene and vinylstyrene; monoolefins such as ethylene, propylene, butylene and isobutylene; vinyl esters such as vinyl acetate, vinyl propionate, vinyl benzoate, vinyl butylate, vinyl propionate and vinyl benzoate; esters of α-methylene aliphatic monocarboxylic acids such as methyl acrylate, ethyl acrylate, butyl acrylate, dodecyl acrylate, octyl acrylate, phenyl acrylate, methyl methacrylate, ethyl methacrylate and butyl methacrylate; vinyl ethers such as vinyl methyl ether, vinyl ethyl ether and vinyl butyl ether; vinyl ketones such as vinyl methyl ketone, vinyl hexyl ketone and vinyl isopropenyl ketone; and the like, more specifically, polystyrene, styrene-alkyl acrylate copolymer, styrene-maleic anhydride copolymer, polyethylene, polypropylene, and the like. As the binder resins, there may also be employed polyesters, polyurethanes, epoxy resins, silicone resins, polyamides, modified rosins, paraffins and the like. Examples of the coloring agents are, for instance, carbon black, Nigrosine dye, Aniline Blue, Karcoil Blue, Chrome Yellow, Ultramarine Blue, Dupont Oil Red, Quinoline Yellow, Methylene Blue Chloride, Phthalocyanine Blue, Marakite Green Oxalate, Camp Black, Rose Bengal, and the like. The additive to toner for developing electrostatic image of the present invention can also be used by adding to magnetic toners containing magnetic materials. The additive to toner for developing electrostatic image can exhibit their effects with respect to both negatively charged toner and positively charged toner. In addition, the additive to toner for developing electrostatic image has an effect as a charge-controlling agent.

The carbon fluoride particles of the present invention are particularly useful as an additive to resinous coating of carrier for developing electrostatic image. Conventionally, in order to improve the abrasion resistance of the carrier and the toner spent, carbon fluoride particles have been added to the resinous coating of the carrier for developing electrostatic image. However, since the prior carbon fluoride particles have an irregular shape, the powder flowability thereof is bad and the adhesion to the carrier is insufficient, and thus the particles tend to be broken due to friction or the like. In addition, since the particle size distribution is wide, the difference of the F/C is large among the individual particle, and, as a result, the toner charge varies widely. Further, carbon fluoride particles having a large particle size tend to be peeled off from the carrier. The carbon fluoride particles of the present invention, however, have a uniform particle size and are excellent in powder flowability, and further have a narrow particle size distribution, which can provide a novel excellent additive to coating of carrier.

Namely, the present invention also relates to an additive to resinous coating of carrier for developing electrostatic image comprising the carbon fluoride particles, in which a number-average particle size is 0.01 to 50 μm, preferably 0.1 to 50 μm, a content of particles having such a diameter that the particle size distribution falls within the range of the number-average particle size ±20% amounts to at least 50% of the whole, a true specific gravity is 1.7 to 2.5, the F/C of the particle as a whole is 0.001 to 0.3, and the F/C of the particle at the surface is always larger than the F/C as a whole and is 0.1 to 2.0.

Since the additive to coating of the carrier has a shape near sphere, a uniform particle size and a narrow particle size distribution, the additive has a good adhesion to the carrier core and has less possibility of peeled off when abraded. The additive can be produced at a relatively low cost because of a small amount of fluorine content. Therefore, it is possible to improve the abrasion resistance of the carrier and the toner spent at a low cost.

The carrier for developing electrostatic image comprises a carrier core on which coating made of resin is provided. The coating contains the additive to coating of the carrier of the present invention.

The carbon fluoride particles of the additive to coating of the carrier of the present invention are the same as the carbon fluoride particles of the present invention.

The carrier core has a particle size of about 30 to 500 μm. Usually a total amount of the resin and the carbon fluoride particle is 0.1 to 10 parts by weight to 100 parts by weight of the carrier core.

As a method for coating the carrier core with the resin containing the carbon fluoride particles, there are the wet method and the dry method. In the wet method, a coating solution is used. In the dry method, the carrier core particles, the carbon fluoride particles and the resin particles are admixed with agitation or are subjected to the impact-mixing.

Since the carbon fluoride particles have the water-repelling property, the latter dry method is preferred. Examples of the machines used in the dry method are impact type surface improving machines such as Hybridizer (available from Nara Kikai Seisakusho) and Mechanomill (available from Okada Seiko), high speed agitation type mixers such as Laboratory Matrix (available from Nara Kikai Seisakusho), Vertical Granulator (available from Fuji Sangyo) and Spiral Flow Coater (available from Froint).

According to the carbon fluoride particles of the present invention, a charging characteristic of the particle can be controlled to some extent by controlling the degree of the F/C at the surface. For example, since when the F/C at the surface is larger the particles show a strong negative charge, the carrier for developing electrostatic image is usually a negatively chargable carrier which endows the toner with positive charge. The charge characteristic also depends on the charge characteristic of the resin, and therefore a positively chargable carrier can be obtained depending on the F/C at the surface of the carbon fluoride particles contained in the resin and on the content of the particles. Examples of the resins are fluorine-containing resins and silicone resins for the negatively chargable carrier, and the styrene-acrylate resin for the positively chargable carrier.

The carbon fluoride particles of the present invention have a similar certain electric conductivity. It is known that toners having a conductivity to some extent are generally excellent in reproducability of image or the like.

A content of the carbon fluoride particles in the resinous coating is in the range of 0.5 to 65% by weight. When the content of the carbon fluoride particles is smaller, the obtained resinous coating is inferior in abrasion resistance, and when larger the dispersibility of the carbon fluoride particles is worse and the carbon fluoride particles tend to be peeled off easily from the carrier surface. A preferred content is 5 to 40% by weight.

As materials of the carrier core used in the present invention, there may be used sands, glasses, metals, and the like. Preferred materials are substances which are strongly magnetized by magnetic field in the direction of the magnetic field such as ferite, magnetite, ferromagnetic metals such as iron, cobalt, nickel, alloys containing the metals and compounds of the metals; alloys which do not show such a ferromagnetic property but show a ferromagnetic property when heat-treating appropriately such as manganese-copper-aluminium and manganese-copper-tin; chromium dioxide; and the like.

Preferred examples of the resin materials are, for instance, fluorine-containing such as polyvinylidene fluoride, polytetrafluoroethylene, polychlorotrifluoroethylene, polytrifluoroethylene, vinylidene fluoride-tetrafluoroethylene copolymer, tetrafluoroethylene-hexafluoropropylene copolymer, tetrafluoroethylene-perfluoro(vinyl ether) copolymer, tetrafluoroethylene-ethylene copolymer, vinylidene fluoride-tetrafluoroethylene-chlorotrifluoroethylene copolymer, vinylidene fluoride-tetrafluoroethylene-hexafluoropropylene copolymer and vinylidene fluoride-chlorotrifluoroethylene copolymer; fluorinated (meth) acrylate resins represented by the formulae:

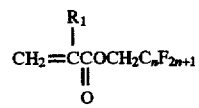

and

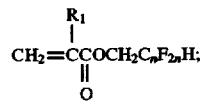

styrene resins; styrene-alkyl (meth)acrylic resins; (meth) acrylic resins; epoxy reins; polyethylene resins; polypropylene resins; polybutadiene resins; polyurethane resins; polyester resins; polyamide resins; polycarbonate resins; silicone resins; and the like.

The present invention further relates to a fixing roller of a heat roller fixing machine for an electrostatic copying machine, which is coated with a composite material in the form of film or paint to which is added the carbon fluoride particles of the present invention.

In the electrostatic copying machine, a recently, popularly used method for fixing a toner image formed on paper is a method with a heat roller. This method is carried out by passing a paper on which a toner image is formed through two tightly contacted rollers, one or both of which being heated from the inside, thereby the toner image is fused on the paper.

This fixing method has various advantages such as a high speed operation and a high heat efficiency in comparison with other method like oven type. Accordingly, in almost of the recent electrostatic copying machines, such a fixing method with these rollers is employed. Generally a fixing roller is produced by coating a surface of the roller made of a metal such as aluminium or stainless steel with a non-adhesive substance such as fluorine-containing resin in order to prevent from offset.

In case of fixing by using such a fixing roller, when an image of toner powder which is positively charged is fixed by contacting with a roller coated with a the fluorine-containing resin, since the fluorine-containing resin is negatively charged due to its lower abrasion charging property, the positively charged toner is electrically absorbed to cause the electrostatic offset, and thus the part of the image is not fixed.

In order to avoid this phenomenon, there has been proposed a fixing roller which is coated with a fluorine-containing resin in which electrically conductive materials are dispersed (JP-A-55374/1980). However, this conductive material (mainly carbon) is not good in releasing property. Therefore, when the conductive material appears on the surface of the fluorine-containing resin coating of the roller, the toner adheres to the appeared portion to cause the hot offset, which results not only in stain of the fixed image but also in shortening of the usable duration of the fixing machine, thereby early change of the fixing roller is required.

In order to prevent the occurrence of both the electrostatic offset and the hot offset, a fixing roller is proposed that prepared by previously surface-treating the conductive materials with a substance having a low surface energy, dispersing the surface-treated conductive materials into the fluorine-containing resin, and then coating the roller surface with the fluorine-containing resin (JP-A-17080/1989). When using a usual wet surface-treating agent is used, though both the electrostatic offset and the hot offset can be prevented temporarily, a sufficient preventing effect cannot be obtained for a long time at a high temperature of about 200° C.

There have been proposed some fixing rollers surface of which is coated with a fluorine-containing resin in which a carbon fluoride is dispersed. For example, in JP-B-44224/1988, there has been proposed a fixing roller coated with a fluorine-containing resin containing a carbon fluoride in a content of 1 to 25 % by weight. However, since the carbon fluoride is electrically insulative, though the prevention of hot offset and the abrasion resistance may be improved, the occurrence of electrostatic offset cannot be prevented. In JP-A-224366/1983, there is disclosed that a carbon fluoride in which an unreacted portion is remained can also be used. Actually, however, the releasing property (prevention of hot offset) and the improvement of abrasion resistance are insufficient, and the roller is decidedly inferior to the carbon fluoride in which no unreacted portion is remained. Further, it is silent about the preventing effect of electrostatic offset as a conductive material.

In JP-B-59468/1990, on the other hand, there has been proposed that a carbon fiber is added as a conductive material and that for improving an abrasion resistance a carbon fluoride is added. However, according to this proposal, not only the preparation step is made complicated due to the use of two additives, but also it is difficult to disperse uniformly and to coat uniformly.

Actually, as described in that specification, the abrasion resistance is somewhat improved by that carbon fluoride, but the electrostatic offset is not prevented.

The fixing roller of the present invention can effectively prevent the both offsets, i.e. electrostatic offset and hot offset, and can maintain such an effect for a long time, and further is excellent in abrasion resistance and heat conductivity.

The carbon fluoride particles used in the present invention as an electric conductive material and a releasing material have a number-average particle size of 0.01 to 50 µm. A content of particles having such a diameter that the particle size distribution falls within the range of the number-average particle size ±20% amounts to at least 50% of the whole. When a ratio of fluorine atom to carbon atom is represented by F/C, the F/C as a whole is 0.001 to 0.5, and the F/C at the surface is always larger than the F/C as a whole and is 0.5 to 2.0.

The carbon fluoride particle is a particle having so-called core-shell structure, and comprises the core portion of carbon which is substantially electrically conductive and the shell portion having a large amount of carbon fluoride which is low in electric conductivity but has a very low surface energy, i.e. a high hot offset preventing effect, in which the F/C of the shell portion being always larger than that of the core portion.

The carbon fluoride particle of the present invention has the F/C as a whole of 0.001 to 0.5. When this F/C is smaller, an amount of the carbon fluoride is not enough to obtain the hot offset preventing effect, and when larger, an electric conductivity is too low to obtain the electrostatic offset previnting effect. Preferred F/C is 0.001 to 0.3.

The composite material for the fixing roller of the present invention is prepared by dispersing the carbon fluoride particles into the matrix resin or matrix rubbers and is formed in film or paint.

Preferred examples of the matrix resins are, for instance, polyolefin resins such as polyethylene and polypropylene, and fluorine-containing resins. Examples of the fluorine-containing resins used in the present invention are polytetrafluoroethylene; copolymers of tetrafluoroethylene with at least one of other copolymerizable ethylenically unsaturated monomer (for example, olefins such as ethylene and propylene, halogenated olefins such as hexafluoropropylene, vinylidene fluoride, chlorotrifluoroethylene (CTFE) and vinyl fluoride, perfluoroalkyl vinyl ethers (PFA); polychloro-fluoride, trifluoroethylene; polyvinylidene fluoride; and the like. Particularly preferable fluorine-containing resins are polytetrafluoroethylene, copolymers of tetrafluoroethylene with at least one of hexafluoropropylene, perfluoro(methyl vinyl ether), perfluoro(ethyl vinyl ether) and perfluoro(propyl vinyl ether) (containing generally in an amount of not more than 40% by mole with respect to tetrafluoroethylene), and the like.

As the rubbers, silicone rubbers or fluorine-containing rubbers are preferred. The fluoro-containing rubbers used in the present invention are highly fluorinated elastic copolymers, and particularly preferable fluorine-containing rubbers are elastic copolymers of generally 40 to 85% by mole of vinylidene fluoride with at least one of other copolymerizable fluorine-containing ethylenically unsaturated monomers. The fluorine-containing rubber which contains iodide in the polymer chain is, for instance, a fluorine-containing rubber which mainly comprises an elastic copolymer of, as mentioned above, 40 to 80% by mole of vinylidene fluoride with at least one of other copolymerizable fluorine-containing ethylenically unsaturated monomers, said copolymer being containing 0.001 to 10% by weight, preferably 0.01 to 5% by weight of iodide at its polymer end (JP-A-40543/1977). Typical examples of the other ethylenically unsaturated monomers which are copolymerized with vinylidene fluoride to provide the elastic copolymers are hexafluoropropylene, pentafluoropropylene, trifluoroethylene, trifluorochloroethylene, tetrafluoroethylene, vinyl fluoride, perfluoro(methyl vinyl ether), perfluoro(ethyl vinyl ether), perfluoro(propyl vinyl ether), and the like. Particularly preferable fluorine-containing rubbers are vinylidene fluoride/hexafluoropropylene elastic copolymer and vinylidene fluoride/tetrafluoroethylene/hexafluoropropylene elastic copolymer.

An amount of the carbon fluoride particles is, in case of film, 0.1 to 50% by weight, preferably 1 to 20% by weight, and in case of paint, 0.1 to 50% by weight in the dry coating, preferably 1 to 20% by weight. As a production process of the fixing roller, there is employed a usual process.

As mentioned above, since the fixing roller of the present invention is provided on its surface with the coating containing the novel carbon fluoride particles having both electric conductivity and low surface energy, both the electrostatic offset and the hot offset can be effectively prevented, and such an effect can be maintained for a long time. Further the coating is excellent in abrasion resistance. In addition, since a large amount of the carbon fluoride particles can be incorporated to the fluorine-containing resin, the heat conductivity can be improved, whereby the thickness of the coating can be increased. From the above-mentioned synergistic effects, the fixing roller having an epoch-making long life can be provided.

The present invention further relates to a gas diffusion electrode comprising an electrode on which surface a layer of a composite material containing the carbon fluoride particles of the present invention, a fluoro resion and a catalyst is provided.

The gas diffusion electrode of the present invention is useful in the battery field as an electrode for an alkaline, sulfuric acid or phosphoric acid fuel cell and as an air electrode for an air battery such as zinc/air battery; and in the industrial electrolytic field, as a hydrogen generating electrode in the salt electrolysis, an electrode for depolarization by oxygen, an chloride generating electrode, an anode for water electrolysis or electroplating, and the like. The gas diffusion electrode is an electrode which reacts in the interface of gas/liquid/solid three layers, i.e. the gas layer which relates to the reaction on an electrode, and the solid layer and the electrolyte layer which has a role as an electrode catalyst to accelerate the electron transferring and the reaction on the electrode. Accordingly, in order to improve performances of the gas diffusion electrode, it is necessary to increase the interface of the three layers by controlling the gas permeable water-repelling area and the hydrophilic area where the electrolyte can exist. In the prior art, as materials for the water-repelling area, therre are used a fluorine-containing resin such as typically polytetrafluoroethylene, and a water-repelling carbon black such as typically acethylene black. The acethylene black used in the water-repelling area does not have a sufficient water-repelling property, oxidation resistance and corrosion resistance to the electrolyte. Thus, when using for a long time, the electrolyte penetrates into the water-repelling area where the gas should pass through, and the gas cannot be supplied enough, then the electric current stops.

There has been tried to improve the water-repelling property, oxidation resistance and corrosion resistance by subjecting the acethylene black to various surface-treatments. For example, JP-A-207893/1987 proposes to improve the water-repelling property, oxidation resistance and corrosion resistance by heat-treating the acethylene black together with a carbon material under an inert atmosphere to convert into a graphite. This method, however, has problems that a temperature higher than 1000° to 2000° C. is required and that the corrosion resistance may be reduced because the growth of the graphite crystal accelerates the formation of an interfacial compound with the phospholic acid in the electrolyte. From this knowledge, there has been tried to use a carbon fluoride, as the water-repelling substance, which is extremely excellent in water-repelling property, oxidation resistance and corrosion resistance (JP-A-118857/1992). The carbon fluoride used in that method is a completely fluorinated one and is electrically insulative. Therefore, though the long life can be accomplished because of its excellent water-repelling property, oxidation resistance and corrosion resistance, there are problems that the internal resistance of the electrode becomes large due to its electrical insulation, and thus the battery performances become lowered and that heat is generated.

In JP-B-31788/1987, there has been proposed an electrically conductive water-repelling partially fluorinated graphite having a low fluorine content, which can exhibit simultaneously both the water-repelling property and the electric conductivity.

As described in the publication, however, when the value x of CFx (x corresponding to the fluorination degree as a whole of the present invention) is lower than 0.2, an electric resistance becomes lower than $1000\Omega \cdot cm^{-1}$, and at the same time a contact angle to water which represents the water-repelling property is at most 120 degree or less. This value of contact angle is excellent in comparison with that of polytetrafluoroethylene (about 110 degree), but is remarkably inferior to the inherent value of carbon fluoride (about 140 degree). Further, though the obtained carbon fluoride prepared by a known preparation process, for example, a process described in the above-mentioned publication has the desired degree of fluorination as a mean value of the whole reaction product, the carbon fluoride is only a mixture in microscopic view. Namely, a small particle has a relatively high fluorination degree and a large particle has a relatively low fluorination degree. When fabricating a gas diffusion electrode by using such carbon fluoride particles having irregular fluorination degrees, the electrolyte penetrates to a portion where the water-repelling property is insufficient, and as a result, a propotion of the interface of the three layers, i.e. gas/liquid/solid decreases, and then the performances of the electrode decrease early.

The carbon fluoride particles of the present invention can provide an epoch-making conductive water-repellent which can solve all of the above problems. Namely, the carbon fluoride particles of the present invention are characterized in that, as mentioned above, the fluorination degree at the surface is large even if the fluorination degree as a whole is not more than 0.2, whereby the excellent water-repelling property equal to the completely fluorinated carbon fluoride can be obtained. Accordingly, since a sufficient water-repelling property can be obtained when the fluorination degree as a whole is low, i.e. an electric resistance being lower, the internal resistance of the gas diffusion electrode can be lowered. Further, since the initial water-repelling property is high, it takes a long time that the electrolyte penetrates even if the electrode is degraded with lapse of time, which can provide a long life electrode.

In addition, since the particle size distribution is narrow and the fluorination degree is uniform, the spot where the electrolyte easily penetrates is difficult to occur in the electrode, and thus the stable interface of the gas/liquid/solid three layers can be maintained for a long time. Accordingly, there can be obtained a battery having a small overpotential and a long life.

The gas diffusion electrode is particularly useful as a fuel electrode and an oxygen electrode for the phosphoric acid fuel cell. Typical structure of the phosphoric acid fuel cell is illustrated in FIG. 1. In the figure, 1 represents a matrix which has a role to maintain a phospholic acid electrolyte, and is made of, for example, a composite material of a fluorine-containing resin and SiC. The element 2 represents a pipe through which a heat medium passes, and is made of a stainless steel which is protected from corrosion by a fluorine-containing resin. The element 3 represents a collecting plate from which an electric current is taken out. The elements 4 and 5 represent a fuel electrode and an oxygen electrode, respectively, where the gas diffusion electrode prepared by the carbon fluoride particles if the present invention is employed.

More specifically, the fuel cell has the two-layer-structure consisting of the electrode catalyst layer which provides the electrode reaction field by forming the three-layer-interface and the gas diffusion layer which smoothly feeds hydrogen or a fuel gas to the electrode catalyst layer.

The electrode catalyst layer is prepared by using a composite material which comprises at least the carbon fluoride particles of the present invention, a fluorine-containing resin as a binder, a carbon black as a catalyst carrier and platinum as a catalyst. When preparing the composite material, an electrode catalyst having a further high performance can be obtained by means of the impact surface improving machine or the high speed agitating mixer (dry type).

The gas diffusion layer is prepared by using a carbon paper which is subjected to the water-repelling treatment. As the water-repelling treatment, a fluorine-treatment is particularly preferable, and before the fluorine-treatment, if necessary, a proper oxidation treatment or a steam modification can be carried out.

The gas diffusion electrode of the present invention is also useful as an air electrode for air battery. Among the air battery, one which has a zinc anode is called as an zinc/air battery. This battery is widely used for a hearing-aid and a beeper, because it is cheap and has a high energy density and a small content of harmful substance. The zinc/air battery comprises an anode of zinc, a cathode of a gas diffusion electrode which utilizes oxygen in air as a cathode active material, and an electrolyte of a concentrated alkaline aqueous solution. Further, in order to prepare a closed-type battery, a water-repelling membrane is used for preventing the electrolyte from leakage to the outside of the battery and supplying oxygen in air smoothly into the battery. Practically, a porous membrane of PTFE (polytetrafluoroethylene) is used, and various oxygen permeable membranes have been studied. Some of the oxygen permeable membranes are good in oxygen permeability but inferior in being water-proof. For improving the membranes ability to be water-proof, it is useful to employ the oxygen permeable membrane to which the carbon fluoride particles are added.

One problem of the zinc/air battery is that characteristics under a high load are bad. Namely, since an air having a low oxygen content is used, when obtaining a large current, it is required for the gas diffusion electrode has high gas permeability. The gas diffusion electrode of the present invention has an excellent gas permeability, and is particularly useful as the air electrode of the zinc/air battery.

As the gas diffusion electrode for the zinc/air battery, the same electrode as of the phosphoric acid fuel cell may be used as it is, and for utilizing effectively the oxygen in air at room temperature, catalysts may be changed. For example, the gas diffusion electrode comprising a composite material prepared from the carbon fluoride particles of the present invention, a catalyst of manganic acids, an active carbon and a binder such as PTFE are suitable.

The present invention further relates to an alkaline battery comprising an anode of a hydrogen-absorbing alloy which is surface-treated with the carbon fluoride particles.

The alkaline battery having an anode of a hydrogen-absorbing alloy has a higher energy density than an prior nickel/cadmium-type alkaline battery, and is widely used as a power of a potable video recorder or a personal computer. Since the alkaline battery of a hydrogen-absorbing alloy has a high energy density, it is possible to discharge for a longer time by one charge than the prior nickel/cadmium-type battery. However, there is a problem that a rapid charging property and a life of charge-discharge cycle are not equal to those of the prior nickel/cadmium battery.

Considering these problems, optimization of the composition of the hydrogen-absorbing alloy has been carried out, and also various surface treatments have been tried. For example, JP-A-139255/1987 proposes the surface-treatment with a dispersion of fluorine-containing resin. According to such treatment, the interface of gas/liquid/solid three layers is formed by endowing the surface of the hydrogen-absorbing alloy electrode with water-repelling property, at which portion the oxygen generated by the rapid charging can be electrochemically reduced.

Thereby, the rapid charging performance can be improved and the increase of the inner pressure of the battery at overcharge can be inhibited. However, when the dispersion of fluorine-containing resin is exposed to atomic hydrogen or oxygen in the concentrated alkaline electrolyte, the water-repelling property cannot be maintained stably for a long time. Since the fluorine-containing resin is not electrically conductive, the internal resistance of the electrode becomes large, which results in lowering the battery performances.

According to the carbon fluoride particles of the present invention, all of the above problems can be solved at once. Namely, since the carbon fluoride particles of the present invention have a higher water-repelling property than usual fluorine-containing resins and an excellent chemical stability, the same effects as of the usual fluorine-containing resin can be obtained in a smaller amount, and the effects can be maintained for a long time. Further, since also the conductivity is excellent, the internal resistance of the battery does not increase, thereby a battery having a small overpotential can be provided.

Since the carbon fluoride particles used in the present invention have a uniform particle size, it is not necessary to change the fluorination condition stepwise, and thus, the reaction can be carried out for a short time at a relatively high temperature to convert to the carbon fluoride. As a result, the center portion of the carbon particle is less fluorinated, and only the surface of the carbon particle is highly fluorinated. Because the center portion is less fluorinated, as explained above, the breakage of the particle does not occur. Accordingly, the carbon fluoride particles of the present invention maintain the narrow particle size distribution and the spherical shape of the starting carbon particle. In addition, an amount of fluorine for the fluorination can be saved.

The carbon fluoride particle of the present invention has a low true specific gravity and does not affect to the inherent properties owned by the prior carbon fluoride particles such as water-repelling property, oil-repelling property, non-adhesive property and lubricating property.

The present invention is explained by means of Examples, but the present invention is not limited to the Examples.

In Examples, a true specific gravity is measured by a pyconometer method with ethanol. The other factors, i.e. number-average particle size, particle size distribution and degree of sphere are measured by the methods explained in the above detailed description.

Dispersibility is measured by adding 1 ml of a nonionic surfactant (Triton X—100 a poly(oxyethylene ocryl phenyl ether) available from Rohm & Haas Company) to 100 ml of distilled water, and thereto adding 10 g of carbon fluoride particles, agitating for 10 minutes at 13,000 per minute with a homogenizer (Nippon Seiki Kabushiki Kaisha), poring the resulting dispersion into a test tube, allowing to stand for 6 hours, and then observing with naked eyes. The one which maintains the dispersing state is represented by ◯, and the one which is clearly separated to two layers, i.e. supernatant layer and precipitated layer is represented by X.

EXAMPLE 1

An amount of 10 g of Mesocarbon microbeads (MC) heat-treated at 2800° C. (MCMB-6-28 available from Osaka Gas Co., Ltd.; number-average particle size: 6 μm; particle size distribution: particles having a particle size of from 4.8 μm to 7.2 μm amounting to 70% of the whole; degree of sphere: 0.8; true specific gravity: 2.1) was thinly spreaded on a nickel plate and put into a reactor of monel (capacity: 1.5 l). After substitution of air in the reactor with nitrogen, while flowing nitrogen at a flow rate of 1 l/minute, the temperature was raised up to the fluorinating temperature of 400° C. and maintained for 1 hour. Then, fluorine gas diluted to 10% by volume with nitrogen was supplied at a flow rate of 1 l/minute and carbon particles were fluorinated for 0.5 hour. After the end of fluorination, the carbon fluoride particles were immediately cooled to room temperature while flowing nitrogen at a flow rate of 1 l/minute, and then the carbon fluoride particles were taken out.

A F/C of the particle as a whole and a F/C of the particle at the surface of the obtained carbon fluoride particles were measured, and each was 0.01 and 0.57. A number-average particle size was 6 μm, and a particle size distribution was that particles having particle size of 4.8 μm to 7.2 μm occupied 70% of the whole, and a degree of sphere was 0.8. A true specific gravity was 2.1, and dispersibility was good.

EXAMPLES 2 TO 6

By using the same carbon particles as in EXAMPLE 1, fluorination was carried out in the same manner as in EXAMPLE 1 under conditions shown in Table 1. The results of measuring a F/C as a whole and a F/C at the surface of the obtained carbon fluoride particles in the same manner as in EXAMPLE 1 are shown in Table 1, respectively. A number-average particle size, a particle size distribution, a degree of sphere, a true specific gravity and dispersibility are shown in Table 1.

EXAMPLE 7

An amount of 100 g of Medium thermal (MT) of a thermal black (Sevacarb MT-CI available form Columbian Carbon Japan Ltd.; number-average particle size: 0.35 µm; particle size distribution: 60% of particles having a particle size of from 0.28 µm to 0.42 µm; degree of sphere: 1.0; true specific gravity: 1.8) was fluorinated in the same manner as in EXAMPLE 1 under the condition shown in Table 1. The results of measuring the F/C as a whole and the F/C at the surface of the obtained carbon fluoride particles in the same manner as in EXAMPLE 1 are shown in Table 1, respectively. Number-average particle size, particle size distribution, degree of sphere, true specific gravity and dispersibility are also shown in Table 1.

EXAMPLE 8

In the same manner as in EXAMPLE 7 except that reaction time was 1.0 hour, the fluorination was carried out. The results of measuring the F/C as a whole and the F/C at the surface of the obtained carbon fluoride particles in the same manner as in EXAMPLE 1 are shown in Table 1, respectively. Number-average particle size, particle size distribution, degree of sphere, true specific gravity and dispersibility are also shown in Table 1.

results of measuring the F/C as a whole and the F/C at the surface of the obtained carbon fluoride particles in the same manner as in EXAMPLE 1 are shown in Table 1, respectively. Number-average particle size, particle size distribution, degree of sphere, true specific gravity and dispersibility are also shown in Table 1.

COMPARATIVE EXAMPLE 2

An amount of 10 grams of the same carbon particles as in EXAMPLE 7 was thinly spreaded on a nickel plate, and put into a reactor of Monel (a Ni—Cu alloy and a tradename of International Nickel Co., Ltd. After substitution with nitrogen gas, the temperature was raised from room temperature to 400° C. at a rate of 2.5° C./minute with supplying a fluorine gas diluted to 10% by volume with nitrogen, maintained for 30 hours, and then the fluorination was carried out. After the end of the fluorination, the carbon fluoride particles were taken out in the same manner as in EXAMPLE 1. The results of measuring the F/C as a whole and the F/C at the surface of the obtained carbon fluoride particles in the same manner as in EXAMPLE 1 are shown in Table 1, respectively. Number-average particle size, particle size distribution, degree of sphere, true specific gravity and dispersibility are also shown in Table 1.

COMPARATIVE EXAMPLE 3

In the same manner as in COMPARATIVE EXAMPLE 2 except that the temperature-raising rate was 2.5° C./minute and the retention time was 4 hours, the fluorination was carried out. The results of measuring the F/C as a whole and the F/C at the surface of the obtained carbon fluoride particles in the same manner as in EXAMPLE 1 are shown in Table 1, respectively. Number-average particle size, particle size distribution, degree of sphere, true specific gravity and dispersibility are also shown in Table 1.

TABLE 1

| | | Reaction conditions | | | | | Characteristics of carbon fluoride particles | | | | |
| | | | | | F/C | | Number- | | | | |
| | Starting carbon | Concentration of fluorine (%) | Reaction temp. (°C.) | Reaction time (hr) | As a whole | At the surface | average particle size (µm) | Particle size distribution | Degree of sphere | True specific gravity | Dispersibility |
|---|---|---|---|---|---|---|---|---|---|---|---|
| Ex. 1 | MC | 10 | 400 | 0.5 | 0.01 | 0.57 | 6 | 70% | 0.8 | 2.1 | o |
| Ex. 2 | MC | 10 | 400 | 1.0 | 0.02 | 0.65 | 6 | 70% | 0.8 | 2.1 | o |
| Ex. 3 | MC | 10 | 400 | 2.0 | 0.10 | 0.75 | 6 | 70% | 0.8 | 2.1 | o |
| Ex. 4 | MC | 10 | 450 | 2.0 | 0.24 | 0.98 | 6 | 70% | 0.8 | 2.1 | o |
| Ex. 5 | MC | 2 | 450 | 2.0 | 0.01 | 0.37 | 6 | 70% | 0.8 | 2.1 | o |
| Ex. 6 | MC | 20 | 350 | 2.0 | 0.08 | 0.51 | 6 | 70% | 0.8 | 2.1 | o |
| Ex. 7 | MT | 10 | 400 | 2.0 | 0.12 | 1.41 | 0.35 | 60% | 1.0 | 1.8 | o |
| Ex. 8 | MT | 10 | 400 | 1.0 | 0.04 | 0.95 | 0.35 | 60% | 1.0 | 1.8 | o |
| Com. Ex. 1 | MC | 10 | 450 | 8.0 | 0.78 | 1.12 | 10 | 40% | 0.4 | 2.5 | x |
| Com. Ex. 2 | MT | 10 | r.t.–400 | 30.0*) | 1.10 | 1.30 | 0.7 | 40% | 0.5 | 2.5 | x |
| Com. Ex. 3 | MT | 10 | r.t.–400 | 4.0*) | 0.71 | 0.98 | 0.5 | 40% | 0.7 | 2.3 | x |

Surface of the carbon fluoride particles of COMPARATIVE EXAMPLE 1 was like pine-corn.
Surface of the carbon fluoride particles of COMPARATIVE EXAMPLE 2 was like poped corn, and breakage was also observed.
Particle size distribution: percentage of particles having such a diameter that the particle size distribution falls within the range of the number-average particle size ±20%
*): retention time

COMPARATIVE EXAMPLE 1

By using the same carbon particles as in EXAMPLE 1, the fluorination was carried out in the same manner as in EXAMPLE 1 under the condition shown in Table 1. The

EXAMPLE 9

An amount of 100 parts by weight of a polystyrene [Vicorastic D 135 (registered trademark) available from Shell Standard Oil Co., Ltd.], 5 parts by weight of Viales 155

[tradename for carbon black for pigments available from Columbia Ribbon & Manufacturing Co., Ltd.] and 5 parts by weight of Oilblack BW [registered trademark for carbon black pigments available from Orient Kagaku Kogyo Kabushiki Kaisha] and 1 part by weight of the carbon fluoride particles obtained in EXAMPLE 7 were admixed by means of a ball mill, and kneaded, pulvelized, then classified to obtain a toner having an average particle size of 9 μm. To 100 parts by weight of the toner particles were mixed with 1 part by weight of the carbon fluoride particles obtained in EXAMPLE 7 to give a toner of the present invention.

An amount of 2.5 parts by weight of the toner were mixed with 100 parts by weight of a carrier wherein a surface of a spherical ferrite core was coated with a fluorinated methacrylate resin represented by the formula:

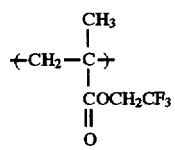

to give a developing agent for electrostatic copying.

Continuous copying test was conducted with 50,000 sheets of paper by using an electrostatic copying machine with which an organic photo-conductive photoreceptor was equipped. The photosensitive body had a negatively chargable two-layer structure consisting of an anthrone pigment as an electron generating substance of the photosensitive body and a curbazole derivative as an electron transporting substance. As a result of a degree of adhesion of the toner to the surface of the photo-conductive body was examined, the toner was scarcely adherred on the surface, and after copying 50,000 sheets there could not be observed on the photocopy any band-like black stripe and any after- image due to the toner remaining on the photosensitive body in the form of image. In addition, after copying 50,000 sheets, when the state of adhesion of the toner to the surface of the carrier was examined by means of a scanning electron microscope, the toner was scarcely adherred. A charged amount which was measured according to the blow-off method decreased by about 2% from the initial charged amount.

EXAMPLE 10

A developing agent for electrostatic copying was prepared in the same manner as in EXAMPLE 9 except that the carbon fluoride particles obtained in EXAMPLE 8 was used, and the continuous copying test was carried out. As a result, there was no problem as in EXAMPLE 9.

EXAMPLE 11

A developing agent for electrostatic copying was prepared in the same manner as in EXAMPLE 9 except that the carbon fluoride particles obtained in COMPARATIVE EXAMPLE 2 was used, and the continuous copying test was carried out. When the surface of the photo-conductive body after copying 50,000 sheets was examined, there was observed that a considerable amount of the toner was adherred, and on the photocopy, there were many stains such as band-like black stripes.

In addition, after copying 5,000 sheets when the state of adhesion of the toner to the surface of the carrier was examined by means of a scanning electron microscope, the toner was adherred in a large amount. A charged amount measured according to the blow-off method decreased by about 20% from the initial charged amount.

EXAMPLE 12

An amount of 30 parts by weight of the carbon fluoride particles obtained in EXAMPLE 3, 70 parts by weight of a polymer (A) represented by the formula:

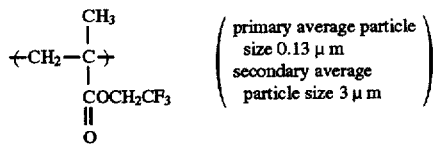

as a resin material and 4,000 parts by weight of a spherical carrier core of ferrite [F-150 available from Powder Tec Co., Ltd., average particle size 80 μm] were admixed and agitated at a temperature of 80° C. by means of a high speed agitating mixer to obtain a carrier wherein the surface of the core was treated by coating.

EXAMPLE 13

A carrier was prepared in the same manner as in EXAMPLE 12 except that 30 parts by weight of the carbon fluoride particles obtained in EXAMPLE 5 were used.

EXAMPLE 14

A carrier was prepared in the same manner as in EXAMPLE 11 except that as a coating resin material, 70 parts by weight of a vinylidene fluoride-tetrafluoroethylene copolymer [(copolymerization ratio 80:20 mol %), primary average particle size 0.15 μm, secondary average particle size 4 μm] were used.

EXAMPLE 15

A carrier was prepared in the same manner as in EXAMPLE 12 except that 30 parts by weight of the carbon fluoride particles obtained in EXAMPLE 6 and, as a coating resin material, a methyl methacrylate-styrene copolymer [(copolymerization ratio 70:30% by weight), primary average particle size: 0.1 μm, secondary average particle size: 3 μm] were used.

EXAMPLE 16

An amount of 1.5 parts by weight of the carbon fluoride particles obtained in EXAMPLE 3 and 3.5 parts by weight of the same resin material (A) as in EXAMPLE 12 were admixed with 100 parts by weight of methyl ethyl ketone.

The same carrier core as in EXAMPLE 12 was coated with the coating material by means of a fluidizing bed machine to obtain a carrier.

COMPARATIVE EXAMPLE 4

A carrier was prepared in the same manner as is EXAMPLE 12 except that 30 parts by weight of the carbon fluoride particles obtained in COMPARATIVE EXAMPLE 1 were used.

EXAMPLE 17

An amount of 100 parts by weight of the carrier obtained in EXAMPLE 12 were admixed with 2.5 parts by weight of a toner having an average particle size of 8 μm which comprises a mixture of 100 parts by weight of a polystyrene resin [Vicorastic D 135, available from Shell Standard Oil Co., Ltd.] 5 parts by weight of Viales 155 [available from Columbia Ribbon & Manufacturing Co., Ltd.] and 5 parts by weight of Oil Black BW [carbon black for pigments available from Orient Kagaku Kogyo Kabushiki Kaisha] to obtain a developing agent for electrostatic copying machine.

Subsequently, a running test was conducted with 50,000 sheets of paper by using an electrostatic copying machine with which an organic photo-conductive photoreceptor was equipped. The photoreceptor had a negatively chargable two-layer structure consisting of an anthoalone pigment as an electrodeposition generating substance of the photoreceptor and a curbazole derivative as an electrodeposition transporting substance. The results are shown in Table 2.

In Table 2, the "Charged amount" is a value of the charged amount per 1 g of toner measured according to the known blow-off method, and the "Coated amount" is percent by weight of the coating material obtained by removing the toner according to the blow-off method, dissolving the coating resin with acetone (at this time, the carbon fluoride particles were also removed from the carrier core), and evaporating the acetone.

EXAMPLES 18, 19 and 20 and COMPARATIVE EXAMPLE 5

The developing agents were prepared in the same manner as in EXAMPLE 17 except that the carriers obtained in EXAMPLES 13, 14 and 15 and COMPARATIVE EXAMPLE 4 were used instead of the carrier obtained in EXAMPLE 12 (respectively, correspond to EXAMPLES 18, 19 and 20 and COMPARATIVE EXAMPLE 5), and the continuous copying was carried out.

The results are also shown in Table 2.

EXAMPLE 21

An amount of 100 parts by weight of a styrene-butyl methacrylate (7:30) copolymer, 10 parts by weight of a carbon black [Regul 66R, available from Cabot Co., Ltd.] and 3.5 parts by weight of a low molecular weight polypropylene [Viscol 66P, available from Sanyo Kasei Kogyo Co., Ltd.] were admixed by means of a ball mill, and kneaded, pulverized and classified to obtain a toner having an average particle size of 9 µm.

An amount of 2.5 parts by weight of the obtained toner and 100 parts by weight of the carrier obtained in EXAMPLE 15 were admixed to obtain a developing agent for electrostatic copying machine.

Then, the continuous copying test with 50,000 sheets was carried out by using an electrostatic copying machine equipped with a photoreceptor containing Se.

The results are also shown in Table 2.

TABLE 2

| | Initial stage | | After copying 50000 sheets | |
|---|---|---|---|---|
| | Charged amount (µm/g) | Coated amount by weight (%) | Charged amount (µc/g) | Coated amount by weight (%) |
| Ex. 17 | +27.5 | 2.32 | +26.8 | 2.28 |
| Ex. 18 | +28.5 | 2.28 | +28.3 | 2.23 |
| Ex. 19 | +35.3 | 2.18 | +34.1 | 2.07 |
| Ex. 20 | +27.0 | 3.10 | +24.8 | 2.85 |
| Ex. 21 | −21.5 | 2.30 | −21.5 | 2.27 |

TABLE 2-continued

| | Initial stage | | After copying 50000 sheets | |
|---|---|---|---|---|
| | Charged amount (µm/g) | Coated amount by weight (%) | Charged amount (µc/g) | Coated amount by weight (%) |
| Com. Ex. 5 | +25.8 | 1.82 | +13.7 | 1.09 |

EXAMPLE 22

A roller ($\phi$ 50 mm) of aluminium was used as an electrically conductive core, and a surface of the roller was previously roughened by sand blasting.

To a PFA resin powder (average particle size 35 µm, spherical particle), the carbon fluoride particles obtained in EXAMPLE 7 were admixed in an amount of 1% by weight and agitated. A surface of the roller was coated with the mixed powder at a thickness of 40 µm according to an electrostatic powder coating method, and then melt and sintered for 20 minutes in an electric furnace at 380° C.

The roller was set in the fixing part of the copying machine, and an image of a negatively charged toner which was formed according to an electrostatic copying method (the toner mainly comprising a styrene-acrylic resin and had an average particle size of 14 µm and a charged amount of −10 to 12 µC/g) was fixed at a roller surface temperature of 180° C. Occurrence of the offset was observed. A case that any offset did not occur is represented by (◯), and a case that the offset occurred even a little is represented by (X).

In order to evaluate the occurrence of the electrostatic offset, there was also evaluated as to an image of a positively charged toner (the toner mainly comprising a styrene-acrylic resin and had a average particle size of 14 µm and a charged amount of +10 to 12 µC/g).

Further, in order to evaluate the durability and the abrasion resistance as to the fixing roller, a paper-passing test with 50,000 sheets of A4 size was conducted. Occurrence of the offset was observed every 10,000 sheets of paper, and after passing 50,000 sheets, the abrasion resistance was evaluated from a decrease of the resin thickness on the surface of the roller. The results of the above-mentioned evaluations are shown in Table 3.

EXAMPLES 23 to 26

The same evaluations as in EXAMPLE 22 were carried out except that the amount of the carbon fluoride particles to be added was changed to 5, 10, 20 and 30% by weight, which correspond to EXAMPLES 23, 24, 25 and 26 respectively.

The results are also shown in Table 3.

TABLE 3

| | Kind of additives | Added amount (% by weight) | Occurence of offset | | | | Abraded amount |
|---|---|---|---|---|---|---|---|
| | | | Initial stage | | Durability (times) | | |
| | | | Negatively charged toner | Positively charged toner | Negatively charged toner | Positively charged toner | |
| Ex. 22 | Carbon fluoride particles of EX. 7 | 1 | ◯ | ◯ | 50000 or more | 30000 to 40000 | 2 μm or less |
| Ex. 23 | Carbon fluoride particles of EX. 7 | 5 | ◯ | ◯ | 50000 or more | 30000 to 40000 | 2 μm or less |
| Ex. 24 | Carbon fluoride particles of EX. 7 | 10 | ◯ | ◯ | 50000 or more | 30000 to 40000 | 2 μm or less |
| Ex. 25 | Carbon fluoride particles of EX. 7 | 20 | ◯ | ◯ | 50000 or more | 30000 to 40000 | 2 μm or less |
| Ex. 26 | Carbon fluoride particles of EX. 7 | 30 | ◯ | ◯ | 50000 or more | 30000 to 40000 | 2 μm or less |

COMPARATIVE EXAMPLES 6 to 10

A fixing roller was fabricated in the same matters in EXAMPLES 22 to 26, except that the carbon fluoride particles were changed to the carbon fluoride particles obtained in COMPARATIVE EXAMPLE 1 in each case. The results are shown in Table 4.

It is clear that the conventional carbon fluoride has a problem that, when using the conventional carbon fluoride for a positively charged toner, the electrostatic offset occurs because they do not have an electric conductivity.

orinated thermal black (Sevacarb MTCI available from Columbian Carbon Co., Ltd.) was used as it is, instead of the carbon fluoride particles. The results are shown in Table 5.

It is clear that addition of the carbon inhibits the non-adhesive property of PFA, and therefore, no function was exhibited with respect to both the positively charged toner and the negatively charged toner.

From the above-mentioned results, it is clear that, by using the carbon fluoride of the present invention, in each case of the positively charged toner and the negatively charged toner, the offset-preventing effect can be continued for a long time.

TABLE 4

| | Kind of additives | Added amount (% by weight) | Occurence of offset | | | | Abraded amount |
|---|---|---|---|---|---|---|---|
| | | | Initial stage | | Durability (times) | | |
| | | | Negtively charged toner | Positively charged toner | Negatively charged toner | Positively charged toner | |
| Com. Ex. 6 | Carbon fluoride particles of Com. EX. 1 | 1 | ◯ | X | 50000 or more | — | 2 μm or less |
| Com. Ex. 7 | Carbon fluoride particles of Com. EX. 1 | 5 | ◯ | X | 50000 or more | — | 2 μm or less |
| Com. Ex. 8 | Carbon fluoride particles of Com. EX. 1 | 10 | ◯ | X | 50000 or more | — | 2 μm or less |
| Com. Ex. 9 | Carbon fluoride particles of Com. EX. 1 | 20 | ◯ | X | 50000 or more | — | 2 μm or less |
| Com. Ex. 10 | Carbon fluoride particles of Com. EX. 1 | 30 | ◯ | X | 50000 or more | — | 3 to 5 μm |

COMPARATIVE EXAMPLES 11 to 15

A fixing roller was fabricated and evaluated in the same mariner as in EXAMPLES 22 to 26 except that an unflu-

TABLE 5

| | Kind of additives | Added amount (% by weight) | Occurence of offset | | | | |
|---|---|---|---|---|---|---|---|
| | | | Initial stage | | Durability (times) | | |
| | | | Negtively charged toner | Positively charged toner | Negatively charged toner | Positively charged toner | Abraded amount |
| Com. Ex. 11 | Untreated thermal black | 1 | X | X | — | — | — |
| Com. Ex. 12 | Untreated thermal black | 5 | X | X | — | — | — |
| Com. Ex. 13 | Untreated thermal black | 10 | X | X | — | — | — |
| Com. Ex. 14 | Untreated thermal black | 20 | X | X | — | — | — |
| Com. Ex. 15 | Untreated thermal black | 30 | X | X | — | — | — |

EXAMPLES 27 to 31

An amount of 50 grams of a typical electrically conductive carbon black, i.e. Kejhen Black (commercial name, available from Ketjen Black International Co., Ltd.; average particle size: 0.03 µm) was fluorinated in the same manner as in EXAMPLE 1 except that the reaction time was one hour.

As a result of measuring the F/C as a whole and the F/C at the surface of the obtained carbon fluoride particles in the same manner as in EXAMPLE 1, the F/C as a whole was 0.09 and the F/C at the surface was 0.69.

By using the obtained carbon fluoride particles, the evaluation as to the fixing roller was conducted in the same manner as in EXAMPLES 22 to 25. The results are shown in Table 6.

The obtained carbon fluoride shows more excellent electric conductivity than the carbon fluoride of EXAMPLE 7 which is the fluorinated thermal black, and therefore it is clear that the durability to the positively charged toner is more excellent.

COMPARATIVE EXAMPLES 16 to 20

A fixing roller was prepared in the same manner as in EXAMPLES 27 to 31 except that an unfluorinated Ketjen Black EC was used instead of the carbon fluoride particles, and the same evaluation was carried out. The results are shown in Table 7.

Although the electric conductivity is better than the thermal black, a non-adhesive property is decreased as in COMPARATIVE EXAMPLES 11 to 15.

TABLE 6

| | Kind of additives | Added amount (% by weight) | Occurence of offset | | | | |
|---|---|---|---|---|---|---|---|
| | | | Initial stage | | Durability (times) | | |
| | | | Negtively charged toner | Positively charged toner | Negatively charged toner | Positively charged toner | Abraded amount |
| Ex. 27 | Carbon particles of fluorinated Ketjen black | 1 | O | O | 50000 or more | 40000 to 50000 | 2 µm or less |
| Ex. 28 | Carbon particles of fluorinated Ketjen black | 5 | O | O | 50000 or more | 40000 to 50000 | 2 µm or less |
| Ex. 29 | Carbon particles of fluorinated Ketjen black | 10 | O | O | 50000 or more | 40000 to 50000 | 2 µm or less |
| Ex. 30 | Carbon particles of fluorinated Ketjen black | 20 | O | O | 50000 or more | 40000 to 50000 | 2 µm or less |
| Ex. 31 | Carbon particles of fluorinated Ketjen black | 30 | O | O | 50000 or more | 40000 to 50000 | 2 µm or less |

TABLE 7

| | Kind of additives | Added amount (% by weight) | Occurence of offset | | | | Abraded amount |
|---|---|---|---|---|---|---|---|
| | | | Initial stage | | Durability (times) | | |
| | | | Negtively charged toner | Positively charged toner | Negatively charged toner | Positively charged toner | |
| Com. Ex. 16 | Untreated Ketjen black | 1 | O | O | 10000 to 20000 | 10000 to 200000 | 2 to 3 μm |
| Com. Ex. 17 | Untreated Ketjen black | 5 | X | X | 10000 to 20000 | 10000 to 200000 | 2 to 3 μm |
| Com. Ex. 18 | Untreated Ketjen black | 10 | X | X | 10000 to 20000 | 10000 to 200000 | 2 to 3 μm |
| Com. Ex. 19 | Untreated Ketjen black | 20 | X | X | 10000 to 20000 | 10000 to 200000 | 2 to 3 μm |
| Com. Ex. 20 | Untreated Ketjen black | 30 | X | X | 10000 to 20000 | 10000 to 200000 | 2 to 3 μm |

EXAMPLES 32 to 36

In EXAMPLES 27 to 31, the PFA powder and the carbon fluoride particles were only mixed. In EXAMPLES 32 to 36, the PFA powder and the carbon fluoride particles were treated for 10 minutes by means of a hybridizer (NHS-O Type, available from Nara Kikai Seisakusho Kabushiki Kaisha) under a condition of a peripheral velocity of 80 m/s to give a composite powder, and then a powder coating was carried out by using the composite powder. The results are shown in Table 8.

The results shows more excellent properties than those of EXAMPLES 7 to 31. The reason is assumed that the mixing of carbon fluoride particles and PFA is extremely efficiently carried out even from microscopic observation, and therefore the electrostatic coating is uniformly carried out.

The obtained carbon fluoride particles were dispersed and mixed with 30 parts by weight of a polytetrafluoroethylene (Polyflon Dispersion D-3, available from Daikin Industries, Ltd., commercial name), 2000 parts by weight of a surfactant (Triton X-100, poly(oxyethlene ocryl phenyl ether) 10% aqueous solution) and 40 parts by weight of an acetylene black treated with $HNO_3$ by means of an ultrasonic homogenizer (frequency 38 KHz, rotation 1200 rpm). 8.4 Parts by weight of $H_2PtCl_6$ was added and mixed therewith, and the mixture was dried according to a lyophilization method (temperature: $-70°$ C.$\rightarrow 80°$ C.). The obtained powder was heated at 300° C. for 2 hours in an atmosphere of hydrogen, and the surfactant was removed, and then, 4 parts by weight of platinum fine particles was carried thereon.

Then the obtained platinum-carrying powder was packed into a press die, and a raw material of a supplying layer

TABLE 8

| | Kind of additives | Added amount (% by weight) | Occurence of offset | | | | Abraded amount |
|---|---|---|---|---|---|---|---|
| | | | Initial stage | | Durability (times) | | |
| | | | Negtively charged toner | Positively charged toner | Negatively charged toner | Positively charged toner | |
| Ex. 32 | Hybridized carbon fluoride particles which is a fluorinated Ketjen black | 1 | O | O | 50000 or more | 50000 or more | 2 μm or less |
| Ex. 33 | Hybridized carbon fluoride particles which is a fluorinated Ketjen black | 5 | O | O | 50000 or more | 50000 or more | 2 μm or less |
| Ex. 34 | Hybridized carbon fluoride particles which is a fluorinated Ketjen black | 10 | O | O | 50000 or more | 50000 or more | 2 μm or less |
| Ex. 35 | Hybridized carbon fluoride particles which is a fluorinated Ketjen black | 20 | O | O | 50000 or more | 50000 or more | 2 μm or less |
| Ex. 36 | Hybridized carbon fluoride particles which is a fluorinated Ketjen black | 30 | O | O | 50000 or more | 50000 or more | 2 μm or less |

EXAMPLE 37

An amount of 120 grams of an acetylene black (Denka Black, available from Denki Kagaku Kogyo Kabushiki Kaisha, commercial name) was fluorinated in the same manner as in EXAMPLE 1 except that the reaction time was 2 hours to obtain carbon fluoride particles having a degree of fluorination as a whole of 0.18, a degree of fluorination at the surface of 0.92 and an average particle size of 0.042 μm.

consisting of 70 parts by weight of the above-mentioned carbon fluoride particles and 30 parts by weight of the polytetrafluoroethylene was added thereon, and hot-pressed at 380° C. under 600 kg/cm² for 3 seconds without stirring to obtain a reaction layer of a gas diffusion electrode having an area of 100 cm² and a thickness of 0.5 mm. The properties of the gas diffusion electrode are shown in Table 9.

COMPARATIVE EXAMPLE 21

A gas diffusion electrode was prepared in the same manner as in EXAMPLE 37 except that an untreated acetylene black was used instead of the carbon fluoride particles of the present invention. The properties of the gas diffusion electrode are also shown in Table 9.

COMPARATIVE EXAMPLE 22

A mixture of 30 parts by weight of a vinyl chloride resin (Denka Vinyl SS-119S, available from Denki Kagaku Kogyo Kabushiki Kaisha, commercial name), 100 parts by weight of an acetylene black and 80 parts by weight of water was granulated by means of a mixing and granulating machine, and dried. The granulates were supplied into an oven wherein $N_2$ was filled and a temperature was kept at 1300° C., and sintered for 1 hour to obtain 109 parts by weight of a carbon powder. A gas diffusion electrode was prepared in the same manner as in EXAMPLE 37 except that the obtained carbon powder was used instead of the carbon fluoride particles of the present invention. The properties thereof are also shown in Table 9.

COMPARATIVE EXAMPLE 23

A gas diffusion electrode was prepared in the same manner as in EXAMPLE 37 except that the carbon fluoride described in COMPARATIVE EXAMPLE 2 was used instead of the carbon fluoride particles of the present invention. The properties thereof are also shown in Table 9.

COMPARATIVE EXAMPLE 24

An amount of 12 grams of a graphite powder (SGP-25, available from Kabushiki Kaisha SEC, commercial name, average particle size 25 μm) was put into a pressure resistive reactor of monel. After reducing a pressure to not more than 10 Pa, 8.0 g of a fluorine gas was introduced and the reactor was sealed. A temperature was raised from room temperature to 400° C. at a rate of 5° C./min. and kept at 400° C. for 1 hour, and allowed to cool. After substituting the air in the reactor with nitrogen, the product was taken out. The degree of fluorination of the product as a whole was 0.19. A gas diffusion electrode was prepared in the same manner as in EXAMPLE 37 except that the obtained carbon fluoride was used instead of the carbon fluoride particles of the present invention. The properties are also shown in Table 9.

TABLE 9

| | Electric specific resistance (Ω · cm) | Gas permeability ($10^{-3}$ ml(5.0 atm $O_2$)/cm · sec) |
|---|---|---|
| Ex. 37 | 0.52 | 32.1 |
| Com. Ex. 21 | 0.40 | 20.0 |
| Com. Ex. 22 | 0.09 | 23.3 |
| Com. Ex. 23 | 1.86 | 35.8 |
| Com. Ex. 24 | 0.73 | 25.6 |

In COMPARATIVE EXAMPLE 21, although the electric specific resistance is a sufficient value, the gas permeability is not sufficient because of lack in water-repelling property.

In COMPARATIVE EXAMPLE 22, both a water-repelling property and an electric specific resistance are improved because the graphite crystals in the carbon black particles were grown more than those of COMPARATIVE EXAMPLE 21. However, a water repelling property is not sufficient in comparison with the carbon fluoride particles of the present invention, and therefore only a little improvement of the gas permeability is obtained. Furthermore, there is pointed out a problem that, owing to the growth of the graphite crystals, an oxidation resistance and a corrosion resistance to an electrolytic solution become rather wrong.

In COMPARATIVE EXAMPLE 23, a superior gas permeability is observed because of an excellent water-repelling property of the carbon fluoride. However, the carbon fluoride is an electrical insulator, and therefore the electric specific resistance becomes large.

In COMPARATIVE EXAMPLE 24, such an excellent water-repelling property that a carbon fluoride has is not fully exhibited, and the gas permeability is inferior to that of COMPARATIVE EXAMPLE 23. The electric specific resistance is superior to that of COMPARATIVE EXAMPLE 23 because of an electric conductivity, but is inferior to those of COMPARATIVE EXAMPLES 21 and 22.

In EXAMPLE 37, the gas permeability is equal to that of COMPARATIVE EXAMPLE 23 and the electric specific resistance is equal to that of COMPARATIVE EXAMPLE 21. The characteristics thereof are maintained for a long time, and it can be said that the gas diffusion electrode has superior performances in comparison with those of COMPARATIVE EXAMPLES 21 to 24.

EXAMPLE 38

A water-repelling-treated carbon paper (available from Kureha Kagaku Kogyo Kabushiki Kaisha) was pressed and adherred to the gas diffusion electrode of EXAMPLE 37, and the obtained electrode was used as a fuel electrode and an oxygen electrode to produce an phosphoric acid fuel cell having the constitution shown in FIG. 1. In FIG. 1, 1 designates a matrix of 95% of SiC and 5% of PTFE with which 55 parts by weight of phosphoric acid was immersed, 2 designates a pipe to pass a heating medium, 3 designates a collecting plate, 4 designates a fuel electrode of the gas diffusion electrode of the present invention, and 5 designates an oxygen electrode as the same. A thickness of unit cell was 6 mm, and hydrogen was used as a fuel gas, and then a characteristic of current density-cell voltage was measured when discharge at a constant current was done at an operation temperature of 190° C. The results are shown in Table 10.

COMPARATIVE EXAMPLES 25 to 28

Phosphate-type fuel cells were prepared in the same manner as in EXAMPLE 38 except that the gas diffusion electrodes of COMPARATIVE EXAMPLES 21, 22, 23 and 24 were used instead of the gas diffusion electrode of EXAMPLE 37, and they were respectively represented as COMPARATIVE EXAMPLE 25, 26, 27 and 28. The results are also shown in Table 10.

TABLE 10

| | | Current density (mA/cm$^2$) | | | |
|---|---|---|---|---|---|
| | | 50 | 100 | 200 | 400 |
| Cell Voltage (V) | Ex. 38 | 0.91 | 0.89 | 0.86 | 0.81 |
| | Com. Ex. 25 | 0.85 | 0.78 | 0.74 | 0.55 |
| | Com. Ex. 26 | 0.87 | 0.84 | 0.79 | 0.65 |
| | Com. Ex. 27 | 0.89 | 0.86 | 0.81 | 0.71 |

TABLE 10-continued

| | Current density (mA/cm²) | | | |
|---|---|---|---|---|
| | 50 | 100 | 200 | 400 |
| Com. Ex. 28 | 0.88 | 0.85 | 0.79 | 0.69 |

A characteristic of current density-cell voltage of a fuel cell depends on both an electric specific resistance and a gas permeability of a gas diffusion electrode. Namely, when an electric specific resistance is large, as a current density increases, a descent percentage of voltage becomes large according to the Ohm's law. When a gas permeability is low, as a current density increases, supplement of gas consumed by the electrode reaction delays, and there occurs a phenomenon that, when a specific current density is exceeded at a certain level, a cell voltage suddenly descends.

From the above, it can be understood that a cell voltage under a highly-loaded operation, namely a cell voltage at 400 mA/cm² in Table 10, is an indicator to compare a performance of the fuel cell. Table 10 shows that the fuel cell using the carbon fluoride particles of the present invention exhibits the highest cell voltage and has a superior performance. The reason is in that the carbon fluoride particles of the present invention have a high electric conductivity and a high water-repelling property, and therefore a gas diffusion electrode having a small electric specific resistance and a high gas permeability is obtained. In addition, these excellent properties can be maintained for a long time without degradation, and therefore labor and cost required for maintenance such as electrode-exchange can be extremely saved.

EXAMPLE 39

The gas diffusion electrode of EXAMPLE 37 was pressed and adherred to a net of nickel, and the obtained electrode was used as an air electrode. A 4N-aqueous solution of sodium hydroxide was used as an electrolytic solution, and a zinc plate large enough not to be consumed during the evaluation was used as an anode. Thus an zinc/air battery was prepared.

The obtained battery was continuously discharged with a load of 75 Ω in an atmosphere of 60% RH at a temperature of 20° C., and the time (life time) until a terminal voltage fell down to 0.9 V was measured. The results are shown in Table 11.

COMPARATIVE EXAMPLES 29 to 32

Zinc/air batteries were prepared in the same manner as in EXAMPLE 39 except that the gas diffusion electrodes of COMPARATIVE EXAMPLES 21, 22, 23 and 24 were used instead of the gas diffusion electrode of EXAMPLE 37, and they were respectively represented as COMPARATIVE EXAMPLE 29, 30, 31 and 32. The results are also shown in Table 11.

TABLE 11

| | Life time (hour) |
|---|---|
| Ex. 39 | 18.9 |
| Com. Ex. 29 | 10.1 |
| Com. Ex. 30 | 12.3 |
| Com. Ex. 31 | 14.2 |
| Com. Ex. 32 | 13.2 |

The role of a gas diffusion electrode in an zinc/air battery is the same as that in a fuel cell, and therefore the performance of the zinc/air battery corresponds to that of the phosphoric acid fuel cell in EXAMPLE 38. The value of the life time in the evaluation results of EXAMPLE 39 and COMPARATIVE EXAMPLES 29 to 32 substantially represents the degree of polarization property at a large load, because an enough large zinc plate was used as an anode.

As is clear from Table 11, the zinc/air battery wherein the carbon fluoride particles of the present invention were used shows a superior life time. This can be said that since the carbon fluoride particles of the present invention have a high electric conductivity and an high water-repelling property, a gas diffusion electrode having excellent properties at a large load can be provided.

EXAMPLE 40

An amount of 30 parts by weight of the same carbon fluoride particles as used in EXAMPLE 37 were dispersed in 100 parts by weight of a surfactant (Toriton X-100, poly(oxyethylene ocryl phenyl ether) 10% aqueous solution) by means of an ultrasonic homogenizer.

Each metal of lanthanum (La), nickel (Ni), cobalt (Co) and manganese (Mn) of which purities are not less than 99.5%, and Mischmetal (Mm) which contains a rare earth element of not less than 98%, was weighed so that a composition of an alloy was $La_{0.2}Mm_{0.8}Ni_{3.6}Co_{1.0}Mn_{0.4}$, and a uniform alloy was prepared by means of a high-frequency heating furnace. The alloy in a fused state was dropped on a dish which rotated at a high-speed of 20000 rpm in an inert gas atmosphere to obtain a spherical hydrogen-absorbing alloy powder having an average particle size of 60 μm. The powder was further immersed in an aqueous solution of potassium hydroxide (specific gravity: 1.30) at 80° C. for 5 hours, rinsed and dried.

To 100 g of the powder, there was added 25 g of a 2% by weight of aqueous polyvinylalcohol solution, and kneaded to be pasty. A foamed porous nickel body having a porosity of 95 to 96% was uniformly filled with the paste, and dried. Then, a pressure of 500 kg/cm² was applied and a nickel lead was spot-welded. The obtained article was immersed in the above-mentioned dispersion of the carbon fluoride particles and dried to obtain an anode. As a cathord, there was used a known foamed metal having an excess electrical capacity, which was filled with nickel hydroxide. As an electrolytic solution, there was used an aqueous potassium hydroxide solution having a specific gravity of 1.20 in which lithium hydroxide was dissolved at 30 g/l. As a separator, there was used a sulfonation-treated nonwoven fabric of polypropylene. The anode, the cathord and the separator were coiled like a swirl, and put into a container of a C size cell. The electrolytic solution was poured, and the container was sealed to prepare a nickel/metal hydride storage battery of 3000 mAh.

The storage battery was charged under the constant temperature of 20° C., with a charging current of 300 mA for 15 hours in the first cycle of charge, with a charging current of 600 mA for 7.5 hours in the 2nd to 5th cycles of charge, and with a charging current of 1000 mA for 4.5 hours in and after the 6th cycle of charge. Discharge was carried out at 600 mA until a terminal voltage fell down to 0.9 V, and a cycle life time of the battery was examined. In addition, a bottom of the battery was opened, and a pressure sensor was inserted therein, and an internal pressure of the battery was measured. The results are shown in Table 12.

COMPARATIVE EXAMPLE 23

A nickel/metal hydride storage battery was prepared and evaluated in the same manner as in EXAMPLE 40 except that a polytetrafluoroethylene dispersion (Polyflon Dispersion D-1, available from Daikin Industries, Ltd., commercial name) was used instead of the dispersion of the carbon fluoride particles of the present invention. The results are also shown in Table 12.

COMPARATIVE EXAMPLE 34

A nickel hydrogen storage battery was prepared and evaluated in the same manner as in EXAMPLE 40 except that the carbon fluoride particles of COMPARATIVE EXAMPLE 2 were used instead of the carbon fluoride particles of the present invention. The results are also shown in Table 12.

TABLE 12

|  | At the 10th cycle | | At the 100th cycle | |
| --- | --- | --- | --- | --- |
|  | Peak internal pressure at charging (kg/cm$^2$) | Discharge capacity (mAh) | Peak internal pressure at charging (kg/cm$^2$) | Discharge capacity (mAh) |
| Ex. 40 | 3.1 | 3032 | 5.7 | 3001 |
| Com. Ex. 33 | 5.5 | 3004 | 9.4 | 2650 |
| Com. Ex. 34 | 3.3 | 3018 | 6.5 | 2880 |

In COMPARATIVE EXAMPLE 33, the peak internal pressure at the 10th cycle of the charge is highest because a water-repelling property of the fluorine-containing resin is inferior to that of a carbon fluoride, and the degree of degradation at the 100th cycle of the charge is also remarkable, because the fluorine-containing resin is inferior in chemical stability.

In COMPARATIVE EXAMPLE 34, since the interface of the three layers can stably exist for a long time due to an excellent water-repelling and chemical stability of the carbon fluoride, the increase of the internal pressure is restrained for a long time, and thus a cycle life time becomes longer than that of COMPARATIVE EXAMPLE 33.

In EXAMPLE 40, though, at the 10th cycle of charge, there was not a remarkable difference from COMPARATIVE EXAMPLE 34 wherein the completely fluorinated carbon fluoride was used, the descent of voltage in discharging was slow because of a small internal resistance of the battery. As a result, the cycle life time becomes longer, which shows utility of the present invention.

INDUSTRIAL UTILITY

Since the carbon fluoride particles of the present invention has a low F/C as a whole, a high F/C at the surface, a low specific gravity and a narrow particle size distribution, the particles are excellent in dispersibility and powder flowability, and also have a controllable conductivity and charging characteristic. For example, dispersibility to composite materials such as resins, rubbers and greases is excellent. In addition, since the surface area is highly fluorinated in comparison with the inner portion, the particles have the inherent properties of the conventional carbon fluoride such as water-repelling property, oil-repelling property, non-adhesive property and lubricating property. Further, since the carbon fluoride particles of the present invention contain a smaller amount of fluorine, the particles can be produced at a lower cost than the prior carbon fluoride particles. Also, various composite materials can be provide.

Since the additive to toner is excellent in powder flowability and can be dispersed into the toner well, it is possible to save an amount of toner which adheres to the carrier surface and to improve the cleaning of the toner which remains on the surface of the photoreceptor.

When using the additive to coating for carrier, the abrasion resistance and the toner-spent are excellent and the variety of charged amounts is narrow. Further, since the particle shape is spherical and uniform and the particle size distribution is narrow, the adhesion to the carrier is good and thus the particles are not broken and would not be peeled off from the carrier when abrading.

According to the fixing roller, both the electrostatic offset and hot offset do not appear, and these effects can be maintained for a long use.

Since the gas diffusion electrode of the present invention is excellent in gas permeability and has a low internal resistance, the performance at a high current density is particularly excellent. Further, the electrode has a long life time because of its excellent oxidation resistance and corrosion resistance.

The phosphoric acid fuel cell of the present invention is less decrease of cell voltage at a highly loaded operation and has a long life time.

The air battery of the present invention has an excellent performance at a highly loaded operation and less degradation even when using for a long time.

The alkaline storage battery of the present invention is excellent in rapid charging and has a long life of charge-discharge time.

We claim:

1. Carbon fluoride particles in which a number-average particle size is 0.01 to 50 μm, a content of particles having such a diameter that the particle size distribution thereof falls within the range of the number-average particle size ±20% amounts to at least 50% of the whole, a true specific gravity is 1.7 to 2.5, when representing an atomic ratio of fluorine atom to carbon atom as F/C, a F/C of the particle as a whole is 0.001 to 0.2, and a F/C of the particle at the surface is always larger than the F/C as a whole and is 0.3 to 2.0.

2. The particles of claim 1, wherein the F/C as a whole is 0.001 to 0.3, and the F/C at the surface is 0.3 to 2.0.

3. The carbon fluoride particles of claim 1, wherein a degree of sphere is 0.8 to 1.0.

4. Water- and oil-repellents comprising the carbon fluoride particles of claim 1.

5. Non-tackifying agents comprising the carbon fluoride particles of claim 1.

6. Solid lubricants comprising the carbon fluoride particles of claim 1.

7. Agents for imparting electric conductivity comprising the carbon fluoride particles of claim 1.

8. Additives to coating of carrier for developing electrostatic image, comprising the carbon fluoride particles of claim 1.

9. The additives to coating carrier for developing electrostatic image of claim 8, wherein the number-average particle size is 0.1 to 50 μm.

10. Composite materials in which the carbon fluoride particles of claim 1, are added and dispersed into resins, rubbers, metals, ceramics, carbons, oils, organic solvents, water or aqueous solutions.

11. Composite materials in which the composite materials of claim 10, are in the form of film, paint, grease, toner, carrier or plating solution.

12. Composite materials in which the carbon fluoride particles of claim 1, are added and dispersed into solid materials of resins, rubbers, metals, ceramics or carbons.

13. Composite materials in which the carbon fluoride particles of claim 1, are added and dispersed into liquid materials of oils, organic solvents, water or aqueous solutions.

14. The carbon fluoride particles of claim 1, wherein the true specific gravity is 1.7 to 2.0.

15. Gas diffusion electrodes which comprise a layer containing the carbon fluoride particles of claim 1.

16. Alkaline storage batteries in which an anode is formed by using the carbon fluoride particles of claim 1.

17. A process for preparing the carbon fluoride particles of claim 1, which comprises; preheating carbon particles in which a number-average particle size is 0.01 to 50 μm and a content of particles having such a diameter that the particle size distribution falls within the range of the number-average particle size ±20% amounts to at least 50% of the whole, to a temperature range of 350° to 600° C.; introducing a fluorine gas; and reacting the carbon particles with the fluorine gas at a temperature within said temperature range for ten minutes to two hours.

18. The process of claim 17, wherein the carbon fluoride particles have a true specific gravity of 1.7 to 2.0.

* * * * *